(12) United States Patent
Ochi et al.

(10) Patent No.: US 12,411,373 B2
(45) Date of Patent: *Sep. 9, 2025

(54) DISPLAY DEVICE

(71) Applicant: Magnolia White Corporation, Tokyo (JP)

(72) Inventors: Tetsuro Ochi, Tokyo (JP); Ken Sugiyama, Tokyo (JP); Toshiyuki Tsubota, Tokyo (JP); Kazunari Nishita, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/658,233

(22) Filed: May 8, 2024

(65) Prior Publication Data

US 2024/0288723 A1 Aug. 29, 2024

Related U.S. Application Data

(63) Continuation of application No. 18/085,335, filed on Dec. 20, 2022, now Pat. No. 12,019,322, which is a continuation of application No. 17/465,962, filed on Sep. 3, 2021, now Pat. No. 11,536,998, which is a continuation of application No. 16/793,122, filed on Feb. 18, 2020, now Pat. No. 11,112,632, which is a continuation of application No. 16/020,399, filed on Jun. 27, 2018, now Pat. No. 10,901,251, which is a
(Continued)

(30) Foreign Application Priority Data

Nov. 18, 2015 (JP) .................................. 2015-225770
Jun. 9, 2016 (JP) .................................. 2016-115287

(51) Int. Cl.
| | |
|---|---|
| *G02F 1/1333* | (2006.01) |
| *G02F 1/1335* | (2006.01) |
| *F21V 8/00* | (2006.01) |
| *G02F 1/13357* | (2006.01) |

(52) U.S. Cl.
CPC ...... *G02F 1/133308* (2013.01); *G02F 1/1335* (2013.01); *G02B 6/005* (2013.01); *G02B 6/0065* (2013.01); *G02B 6/0078* (2013.01); *G02B 6/0083* (2013.01); *G02B 6/0088* (2013.01); *G02B 6/009* (2013.01); *G02F 1/133314* (2021.01); *G02F 1/133317* (2021.01); *G02F 1/1336* (2013.01); *G02F 2202/28* (2013.01)

(58) Field of Classification Search
None
See application file for complete search history.

(56) References Cited

U.S. PATENT DOCUMENTS 10,101,524 B2 * 10/2018 Tanaka .............. G02F 1/133308
12,019,322 B2 * 6/2024 Ochi ..................... G02F 1/1335

* cited by examiner

*Primary Examiner* — Dung T Nguyen
(74) *Attorney, Agent, or Firm* — K&L Gates LLP

(57) ABSTRACT

A display device is provided and includes a liquid crystal display panel; and a backlight device opposed to the liquid crystal display panel; the backlight device including a frame-shaped structure with a first surface and a second surface, the second surface facing the liquid crystal display panel and being located between the liquid crystal display panel and the first surface; a reflective sheet adhering to the first surface with a first adhesive layer; and a light-shielding member covering a side surface of the liquid crystal display panel.

20 Claims, 20 Drawing Sheets

Related U.S. Application Data continuation of application No. 15/354,229, filed on Nov. 17, 2016, now Pat. No. 10,025,128.

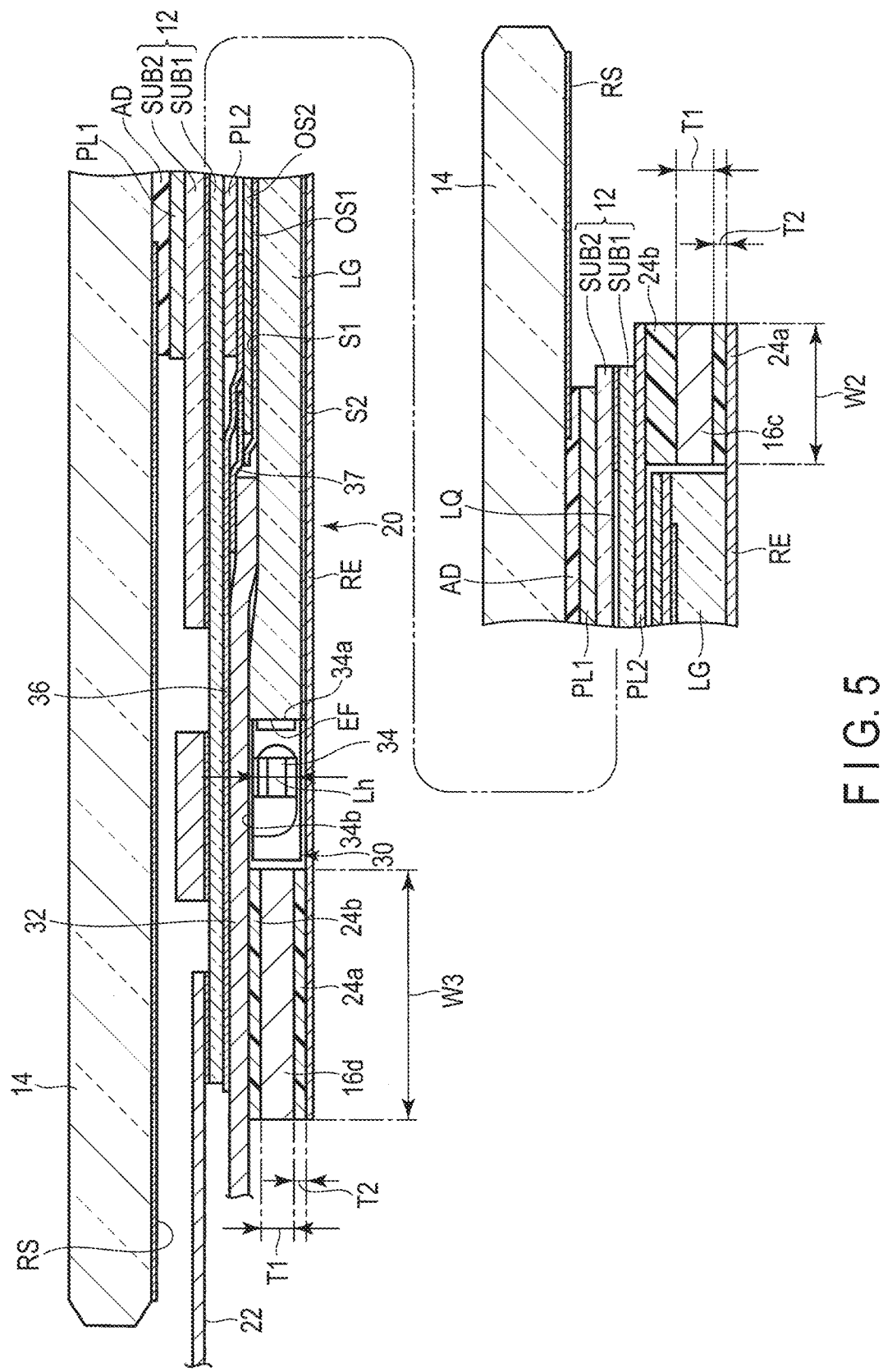
F I G. 5

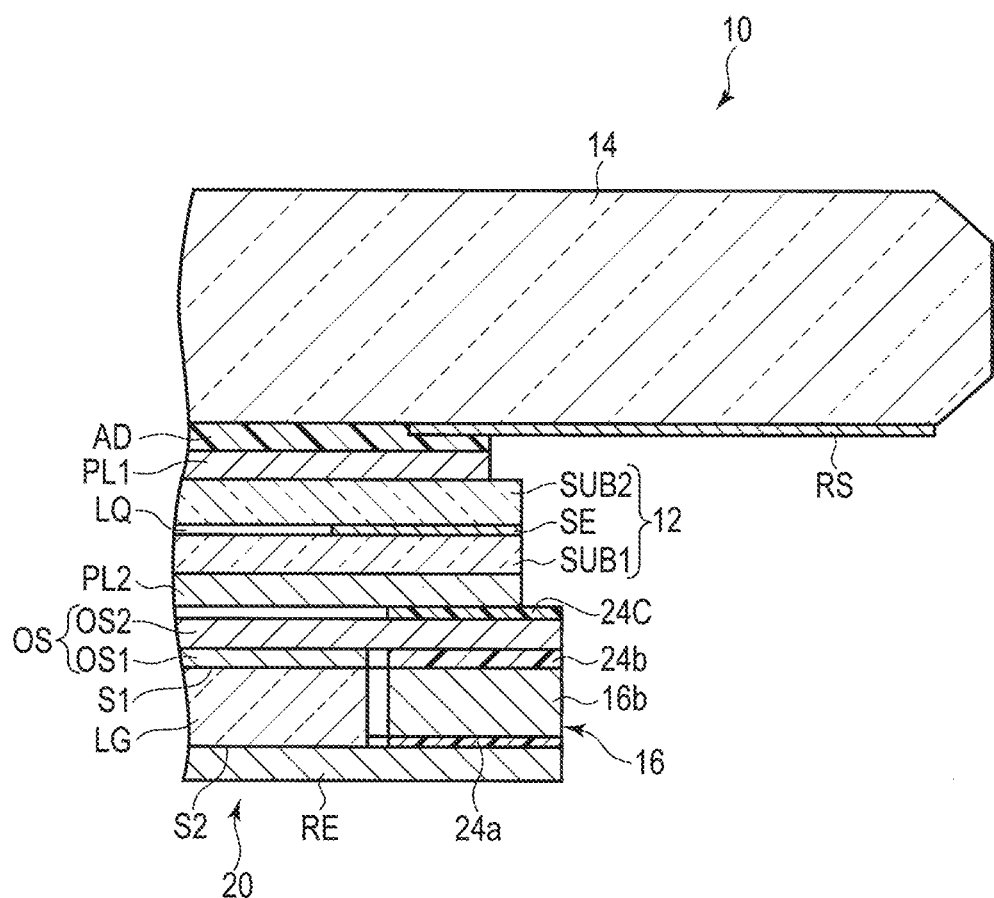
F I G. 14

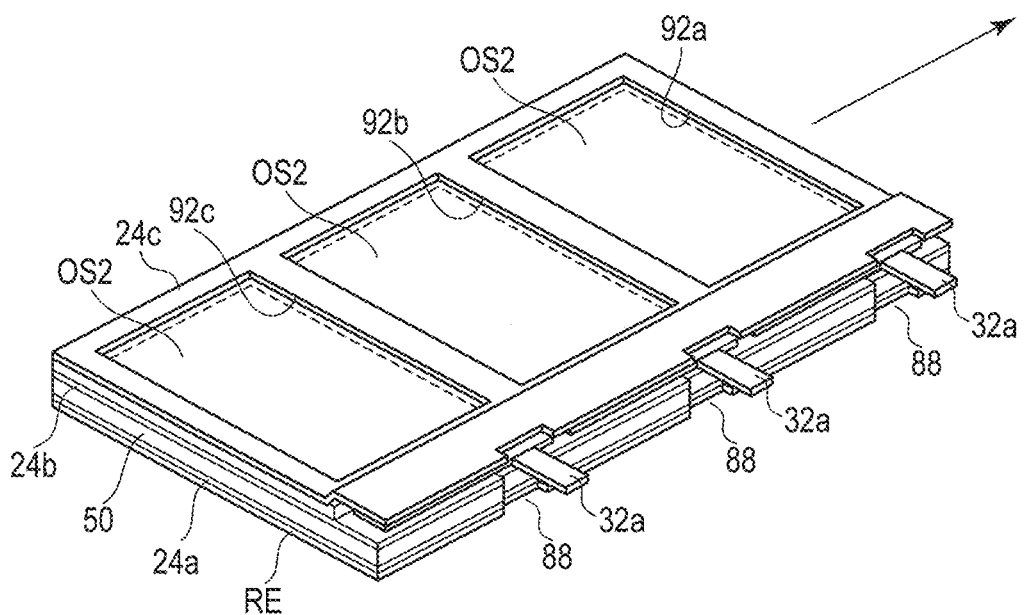
F I G. 21
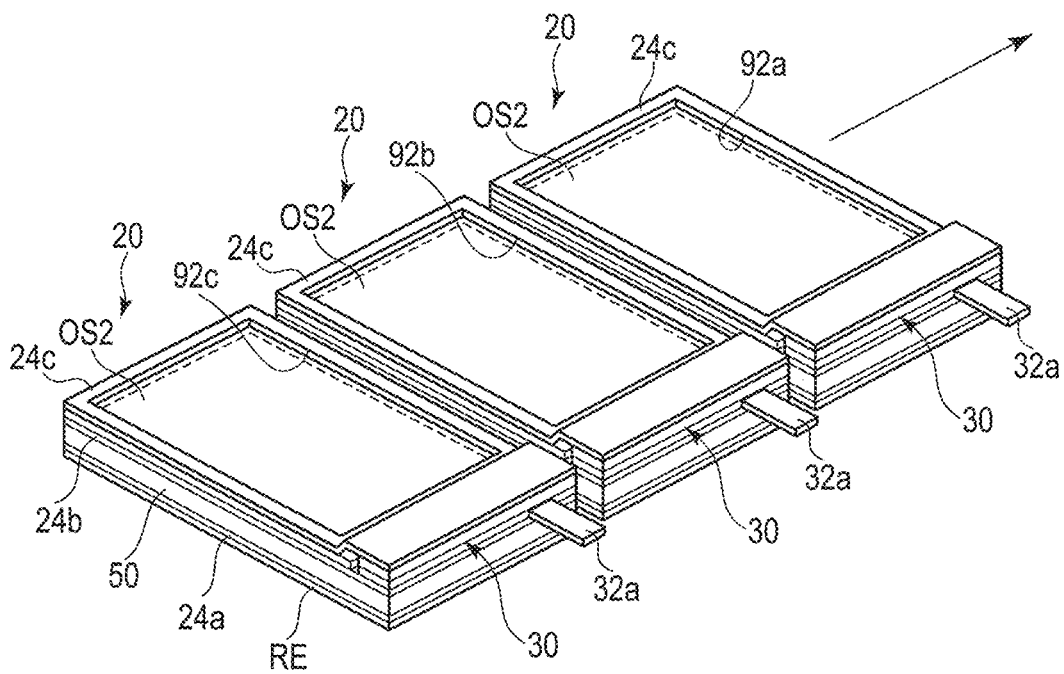
F I G. 22

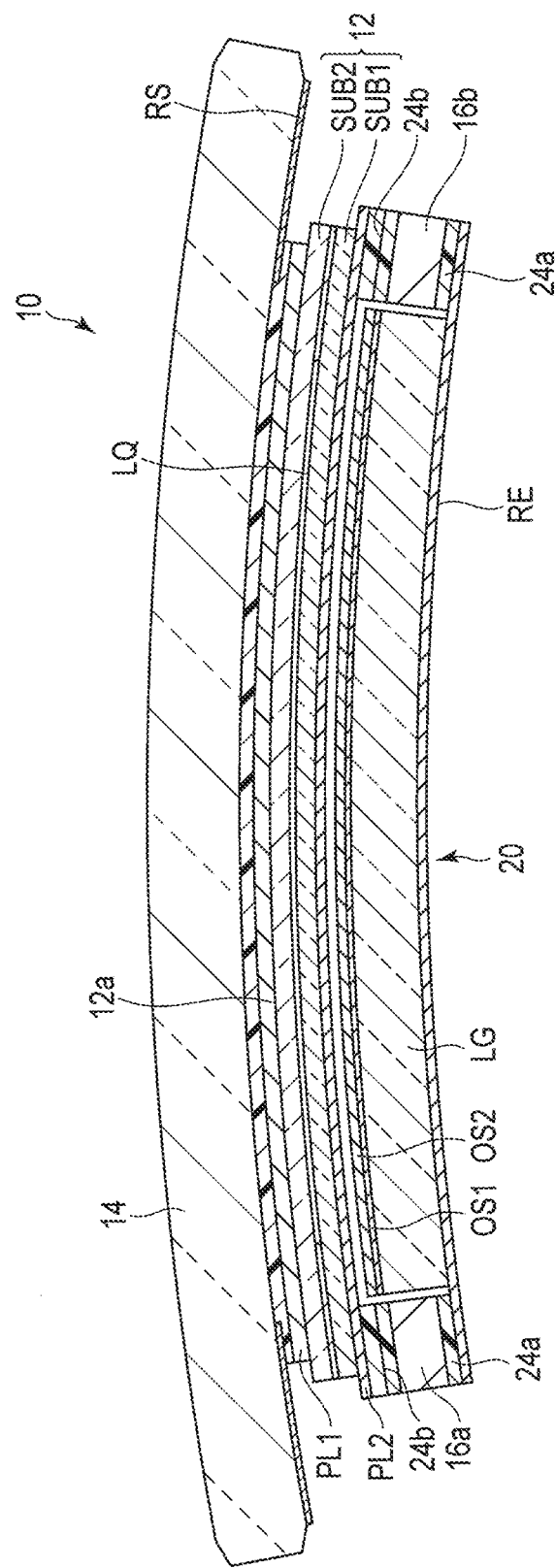
F I G. 25

DISPLAY DEVICE

CROSS-REFERENCE TO RELATED APPLICATIONS

This application is a continuation of U.S. application Ser. No. 18/085,335, filed on Dec. 20, 2022, which application is a continuation of U.S. application Ser. No. 17/465,962, filed on Sep. 3, 2021, and issued as U.S. Pat. No. 11,536,998 on Dec. 27, 2022, which application is a continuation of U.S. application Ser. No. 16/793,122, filed on Feb. 18, 2020, and issued as U.S. Pat. No. 11,112,632 on Sep. 7, 2021, which application is a continuation of U.S. application Ser. No. 16/020,399, filed on Jun. 27, 2018, and issued as U.S. Pat. No. 10,901,251 on Jan. 26, 2021, which application is a continuation of U.S. application Ser. No. 15/354,229, filed on Nov. 17, 2016, and issued as U.S. Pat. No. 10,025,128 on Jul. 17, 2018, which application is based upon and claims the benefit of priority from Japanese Patent Applications No. 2015-225770, filed Nov. 18, 2015; and No. 2016-115287, filed Jun. 9, 2016, the entire contents of all of which are incorporated herein by reference.

FIELD

Embodiments described herein relate generally to a backlight device, a display device with the same, and a method of manufacturing the backlight device.

BACKGROUND

In recent years, liquid crystal display devices have come to be widely used in smartphones, personal digital assistants (PDAs), tablet computers, satellite navigation systems, etc. In general, a liquid crystal display device comprises a liquid crystal display panel and a surface illumination device (backlight device) which is overlaid on the rear surface of the liquid crystal display panel and illuminates the liquid crystal display panel. An example of the surface illumination device is a backlight unit including a reflective layer, a lightguide plate (lightguide), an optical sheet, LEDs as light sources, and a rectangular mold frame. The reflective layer, the lightguide plate, and the optical sheet are stacked on each other, and disposed in the mold frame. The peripheries of the reflective layer, the lightguide plate, and the optical sheet are thereby supported and positioned by the mold frame.

In recent years, as display areas have increased, there has been a continual demand for the frames of liquid crystal display devices to become ever narrower and the liquid crystal display devices to become ever thinner. However, the dimensions of the width, thickness, etc., of the mold frame in the above-described backlight unit is approaching the structural limit of injection molding.

SUMMARY

The present application generally relates to a backlight device, a display device with the same, and a method of manufacturing the backlight device.

In an embodiment, a backlight device is provided. The backlight device includes a frame formed of a sheet material; a first adhesive layer provided on one surface of the frame; a reflective sheet attached to the frame with the first adhesive layer; an optical member disposed on the reflective sheet in the frame; and a light source disposed in the frame and configured to emit light to the optical member, wherein in at least a part of the frame, a width of the frame and a width of the first adhesive layer are equal to each other, and at least an external surface of the frame and an external surface of the first adhesive layer are flush with each other.

Additional features and advantages are described herein, and will be apparent from the following Detailed Description and the figures.

BRIEF DESCRIPTION OF THE DRAWINGS

FIG. 5 is a sectional view of the liquid crystal display device taken along line B-B of FIG. 1.

FIG. 14 is a sectional view showing a part of a liquid crystal display device according to a second embodiment.

FIG. 21 is a perspective view showing a state in which adhesive layers are attached to the optical sheet in the manufacturing processes.

FIG. 22 is a perspective view showing the backlight devices, the outer shapes of which are formed by punching in the manufacturing processes.

FIG. 25 is a sectional view of the liquid crystal display device taken along line C-C of FIG. 24.

DETAILED DESCRIPTION

Figure 1:
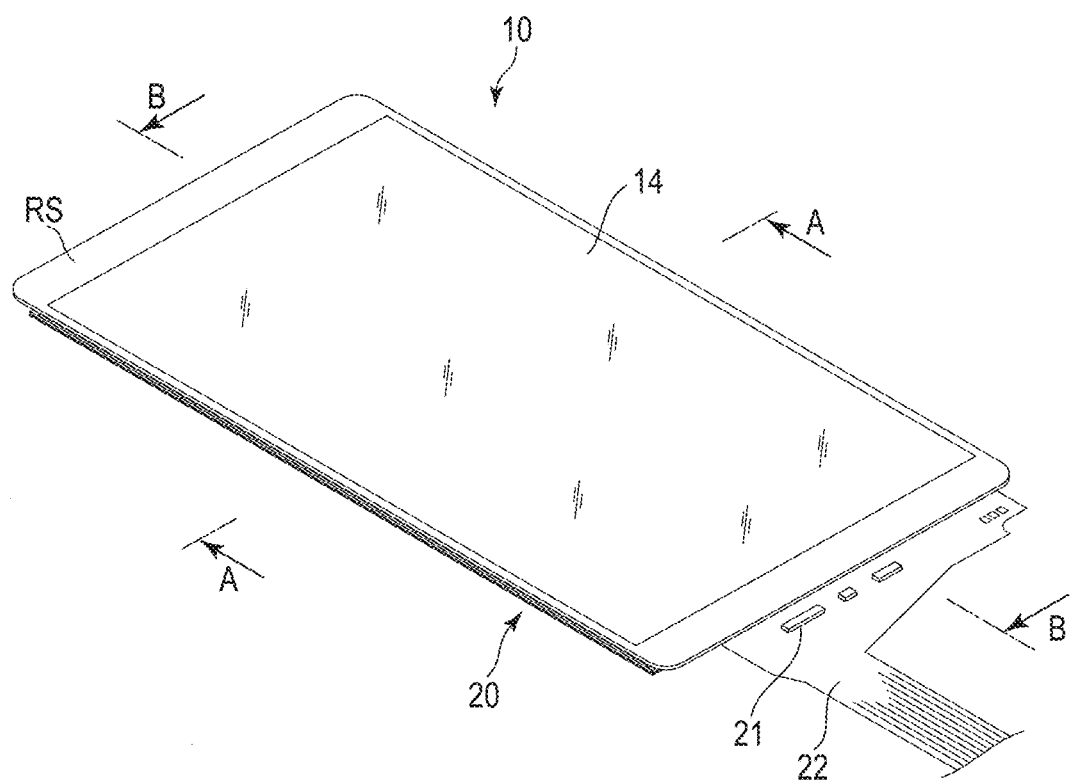
FIG. 1 is a perspective view showing a display surface side of a liquid crystal display device according to a first embodiment.

Various embodiments will be described hereinafter with reference to the accompanying drawings. In general, according to one embodiment, a backlight device comprises a frame formed of a sheet material; a first adhesive layer provided on one surface of the frame; a reflective sheet attached to the frame with the first adhesive layer; an optical member disposed on the reflective sheet in the frame; and a light source disposed in the frame and configured to emit light to the optical member. In at least a part of the frame, a width of the frame and a width of the first adhesive layer are equal to each other, and at least an external surface of the frame and an external surface of the first adhesive layer are flush with each other.

The disclosure is merely an example, and proper changes within the spirit of the invention, which are easily conceivable by a person with ordinary skill in the art, are included in the scope of the invention as a matter of course. In addition, in some cases, in order to make the description clearer, the widths, the thicknesses, the shapes, etc., of the respective parts are schematically illustrated in the drawings, compared to the actual modes. However, the schematic illustration is merely an example, and adds no restrictions on the interpretation of the present invention. Further, in the specification and drawings, the same elements as those described in connection with preceding drawings are given the same reference numbers, and a detailed description thereof is omitted as appropriate.

First Embodiment

Figure 2:
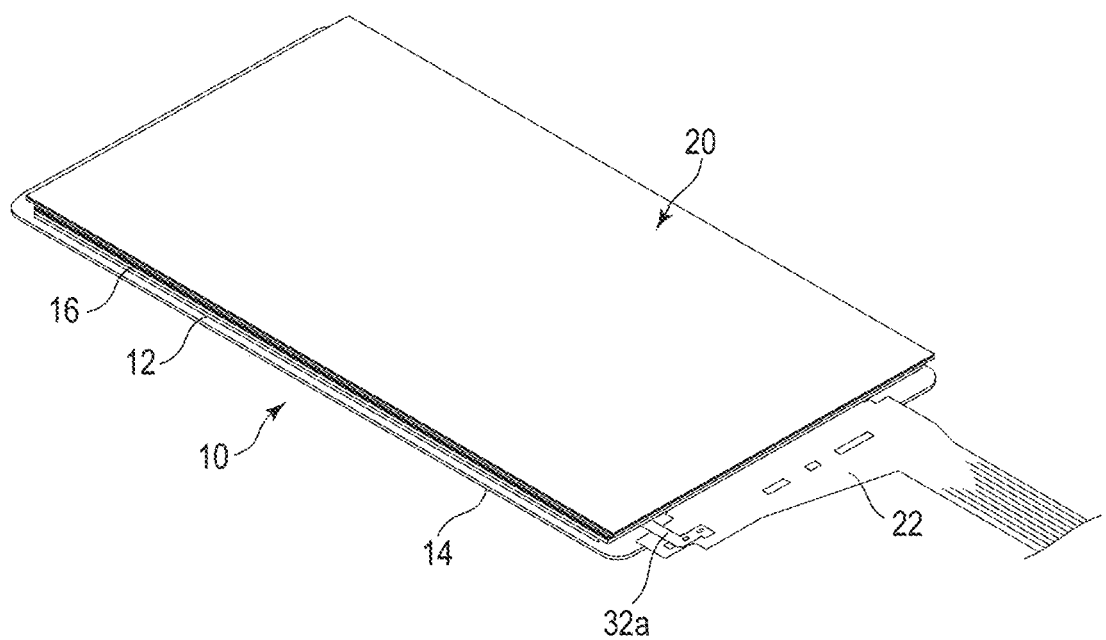
FIG. 2 is a perspective view showing a rear surface side of the liquid crystal display device.
Figure 3:
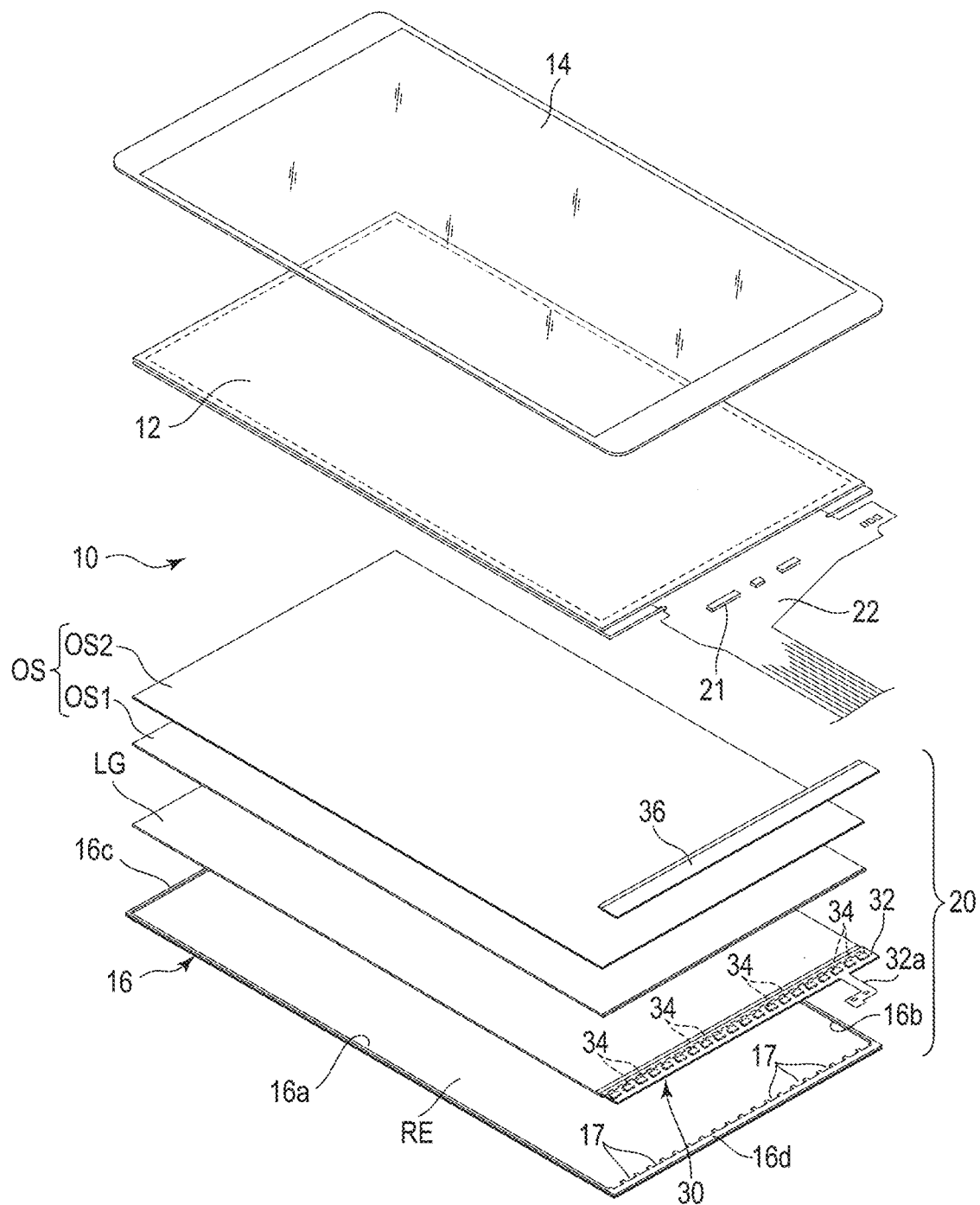
FIG. 3 is an exploded perspective view of the liquid crystal display device.

FIG. 1 and FIG. 2 are perspective views showing a display surface side and a rear surface side of a liquid crystal display device according to a first embodiment, respectively. FIG. 3 is an exploded perspective view of the liquid crystal display device.

A liquid crystal display device 10 can be incorporated into various electronic apparatuses, for example, a smartphone, a tablet computer, a feature phone, a notebook computer, a portable game console, an electronic dictionary, a television set, and a satellite navigation system.

As shown in FIG. 1 to FIG. 3, the liquid crystal display device 10 comprises an active-matrix plate-shaped liquid crystal display panel 12, a transparent cover panel 14 overlaid on a display surface 12a, which is one flat surface of the liquid crystal display panel 12, and covering the whole display surface, and a backlight unit (backlight device) 20 opposed to the rear surface side, which is the other flat surface of the liquid crystal display panel 12.

Figure 4:
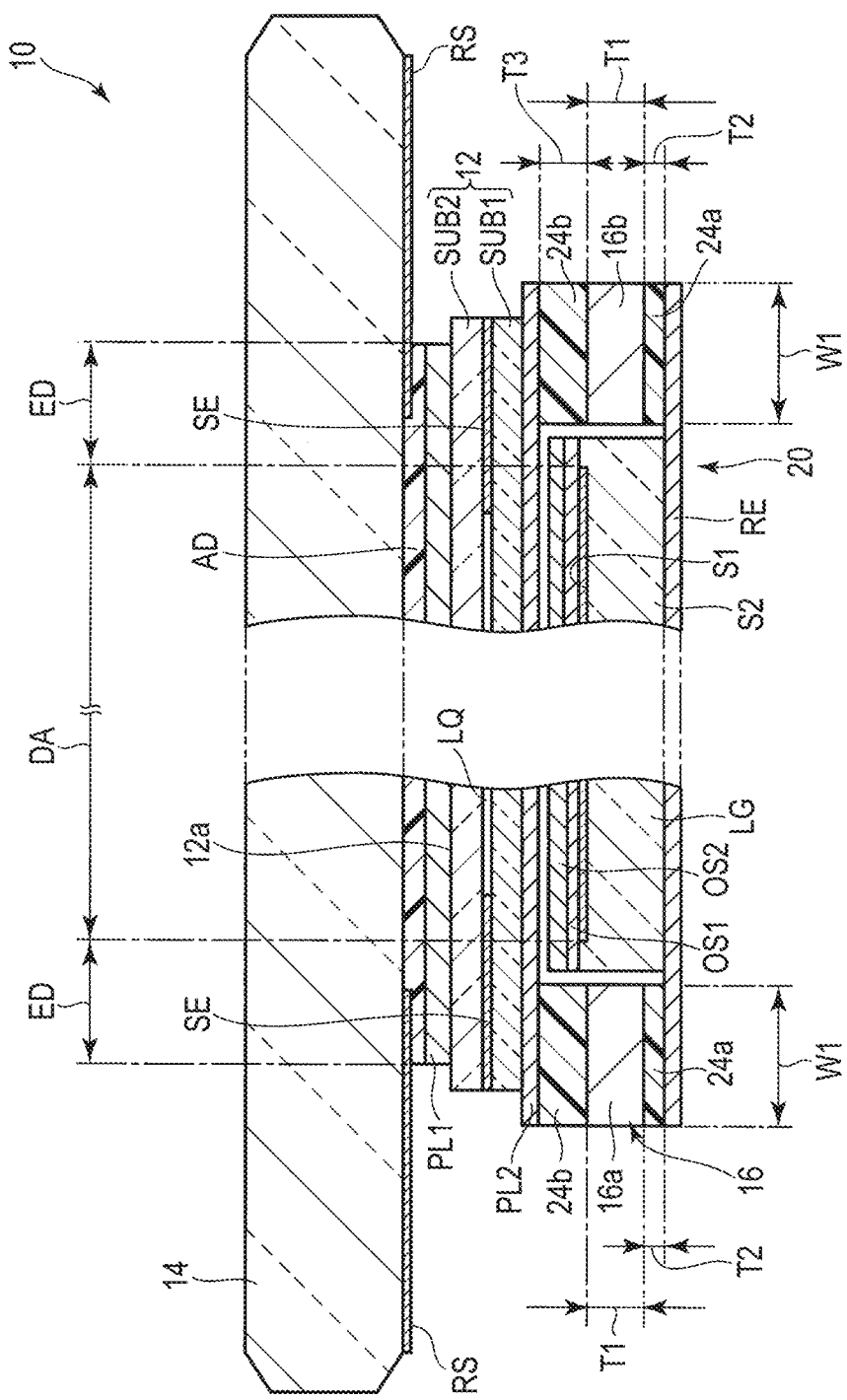
FIG. 4 is a sectional view of the liquid crystal display device taken along line A-A of FIG. 1.

FIG. 4 is a sectional view of the liquid crystal display device taken along line A-A of FIG. 1, and FIG. 5 is a sectional view of the liquid crystal display device taken along line B-B of FIG. 1. As shown in FIG. 3 to FIG. 5, the liquid crystal display panel 12 comprises a first substrate SUB1 in the shape of a rectangular plate, a second substrate SUB2 in the shape of a rectangular plate opposed to the first substrate SUB1, and a liquid crystal layer LQ provided between the first substrate SUB1 and the second substrate SUB2. The periphery of the second substrate SUB2 is affixed to the first substrate SUB1 with a sealing member SE. A polarizer PL1 is attached to the surface of the first substrate SUB1 to form the display surface 12a of the liquid crystal display panel 12. A polarizer PL2 is attached to the surface of the first substrate SUB1 (the rear surface of the liquid crystal display panel 12). In a sectional view taken along line A-A, the polarizer PL2 has dimensions slightly greater than the outside dimensions of the first substrate SUB1, and its end portion projects further outward than that of the first substrate SUB1. In addition, in a sectional view taken along line B-B, that end portion of the polarizer PL2, which is on the side opposite to light sources (described later), projects further outward than the first substrate SUB1.

The liquid crystal display panel 12 is provided with a display area (active area) DA, which is rectangular in a planar view of the display surface 12a, and an image is displayed in the display area DA. In addition, a frame area ED in the shape of a rectangular frame is provided around the display area DA. The liquid crystal display panel 12 is of a transmissive type which has a transmissive display function of displaying an image by selectively transmitting light from the backlight unit 20 to the display area DA. As a display mode, the liquid crystal display panel 12 may primarily include a structure corresponding to a lateral electric field mode in which an electric field substantially parallel to a main surface of the substrate is used, or may primarily include a structure corresponding to a vertical electric field mode in which an electric field substantially perpendicular to the main surface of the substrate is used.

In the shown example, a flexible printed circuit (FPC) 22 is joined to an end portion on a short side of the first substrate SUB1, and extends outward from the liquid crystal display panel 12. On the FPC 22, a semiconductor element such as a driving IC chip 21 is mounted as a signal supply source which supplies drive signals necessary to drive the liquid crystal display panel 12.

As shown in FIG. 1 to FIG. 5, the cover panel 14 is, for example, formed of a glass plate or an acrylic transparent resin and in the shape of a rectangular plate. The cover panel 14 has greater dimensions (width and length) than those of the liquid crystal display panel 12. Thus, the cover panel 14 has a larger area than that of the liquid crystal display panel 12 in a planar view. The lower surface (back surface) of the cover panel 14, for example, is attached to the display surface 12a of the liquid crystal display panel 12 with transparent adhesive AD, and covers the whole display surface 12a of the liquid crystal display panel 12. The periphery of the cover panel 14 projects further outward than the outer periphery of the liquid crystal display panel 12. Each of the long sides of the cover panel 14 is substantially parallel to the associated long side of the liquid crystal display panel 12, and is a predetermined distance from the associated long side. Each of the short sides of the cover panel 14 is substantially parallel to the associated short side of the liquid crystal display panel 12, and is a predetermined distance from the associated short side. In the present embodiment, the distance between each long side of the cover panel 14 and each associated long side of the liquid crystal display panel 12, that is, the width of the periphery on the long sides of the cover panel 14, is less than the distance between each short side of the cover panel 14 and each associated short side of the liquid crystal display panel 12, that is, the width of the periphery on the short sides of the cover panel 14.

A light-shielding layer RS in the shape of a frame is formed on the lower surface (the back surface, or the surface on the liquid crystal display panel side) of the cover panel 14. On the cover panel 14, an area other than that opposed to the display area DA is shielded from light by the light-shielding layer RS. The light-shielding layer RS may be formed on the upper surface (outer surface) of the cover panel 14.

As shown in FIGS. 3 to 5, the backlight unit 20 comprises a frame 16 in the shape of a rectangular frame attached to the rear surface of the liquid crystal display panel 12, a reflective sheet RE attached to the rear surface of the frame 16, optical members disposed in the frame 16, and a light source unit 30 which supplies light to be emitted to the optical members.

The frame 16 is made of a sheet material having a thickness T1 of 0.40 mm (400 μm) or less, for example, 0.15 to 0.25 mm (150 to 250 μm). In addition, the frame 16 is formed to have outside dimensions (width and length) that are slightly greater than those of the liquid crystal display panel 12 but less than those of the cover panel 14. As the sheet material, a resin sheet, for example a sheet of polyethylene terephthalate (PET), or a metal sheet, for example an aluminum sheet, can be used. The sheet material herein used includes a sheet having a thickness of approximately 100 to 300 μm, a film or thin film having a thickness less than 100 μm, etc.

As will be described later, the frame 16 is formed by punching the sheet material, and has predetermined dimensions. The frame 16 is thereby formed to have the thickness T1 that is uniform over the whole perimeter, and smooth in the thickness direction (z-direction in section). In the present embodiment, the thickness T1 of the frame 16 (the thickness of the sheet material) is 0.188 mm (188 μm) or 0.25 mm (250 μm). It is preferable that the thickness T1 of the frame 16 (the thickness of the sheet material) be approximately 0.100 to 0.300 mm.

The frame 16 comprises a pair of longwise bars 16a and 16b opposed to each other and a pair of sidelong bars 16c and 16d opposed to each other. Each of the longwise bars 16a and 16b is formed to have a width W1 of 0.6 mm (600 μm) or less, for example, 0.4 to 0.5 mm (400 to 500 μm). The one sidelong bar 16c is formed to have a width W2 of 0.6 mm (600 μm) or less, for example, 0.4 to 0.5 mm (400 to 500 μm), as in the case of the width W1. In addition, the other sidelong bar 16d may be formed to have a width W3 of 0.6 mm (600 μm) or less, for example, 0.4 to 0.5 mm (400 to 500 μm), as in the case of the width W2. The width W3 of the other sidelong bar 16d may be greater than the width W2. Moreover, depressions 17 are provided on the inner side edge of the other sidelong bar 16d.

A first adhesive layer 24a is provided on the lower surface of the frame 16. In addition, a second adhesive layer 24b is formed on the upper surface of the frame 16. For example, the first adhesive layer 24a has a thickness T2 of 0.03 to 0.06 mm (30 to 60 μm). The second adhesive layer 24b formed on the pair of ling-side portions 16a and 16b and on the sidelong bar 16c has a thickness T3 of 0.03 to 0.06 mm (30 to 60 μm). Accordingly, except for the sidelong bar 16d, the sum of the thicknesses of the frame 16, the first adhesive layer 24a, and the second adhesive layer 24b is, for example, 0.36 to 0.52 mm (360 to 520 μm).

The first adhesive layer 24a has a width equal to the width W1 of the longwise bars 16a and 16b. At least the external surface of the frame 16 and that of the first adhesive layer 24a are flush with each other. In the present embodiment, the internal surface of the first adhesive layer 24a is also flush with that of the frame 16. In other words, in terms of the distance between the longwise bars 16a and 16b of the frame 16, the inside dimension between the longwise bars 16a and 16b and that of the first adhesive between on the longwise bar 16a and on the longwise bar 16b are equal to each other. Similarly, the outside dimension between the longwise bars 16a and 16b and that of the first adhesive between on the longwise bar 16a and on the longwise bar 16b are equal to each other. That is, the longwise bars 16a and 16b and the first adhesive layer 24a formed thereon are not formed in such a way that one of them is wider than the other, and their side surfaces are continuously aligned.

In the present embodiment, also at the sidelong bars 16c and 16d of the frame 16, the first adhesive layer 24a has a width equal to the widths W2 and W3 of the sidelong bars 16c and 16d. The external and internal surfaces of the frame 16 are flush with those of the first adhesive layer 24a, respectively. In other words, in terms of the distance between the sidelong bars 16c and 16d of the frame 16, the inside dimension between the sidelong bars 16c and 16d and that of the first adhesive layer 24a between on the sidelong bar 16c and on the sidelong bar 16d are equal to each other. Similarly, the outside dimension between the sidelong bars 16c and 16d and that of the first adhesive layer 24a between on the sidelong bar 16c and on the sidelong bar 16d are equal to each other.

As the first adhesive layer 24a and the second adhesive layer 24b, double-sided tape with adhesive layers on both surfaces of a base material is used in the present embodiment. These adhesive layers are thereby attached to the frame. The thickness of each of the adhesive layers can be easily adjusted by changing the thickness of the base material. As the adhesive layers, for example, hotmelt adhesive, epoxy adhesive, and UV curing adhesive, can be used. If these kinds of adhesive are used, the adhesive layers are formed by being applied to the frame.

At least at the longwise bars 16a and 16b of the frame 16, the second adhesive layer 24b has a width equal to the width W1 of the longwise bars 16a and 16b. At least the external surface of the frame 16 and that of the second adhesive layer 24b are flush with each other. In the present embodiment, the internal surface of the second adhesive layer 24b is also flush with that of the frame 16. In other words, in terms of the distance between the longwise bars 16a and 16b of the frame 16, the inside dimension between the longwise bars 16a and 16b and that of the second adhesive layer 24b between on the longwise bar 16a and on the longwise bar 16b are equal to each other. Similarly, the outside dimension between the longwise bars 16a and 16b and that of the second adhesive layer 24b between on the longwise bar 16a and on the longwise bar 16b are equal to each other.

In the present embodiment, also at the sidelong bars 16c and 16d of the frame 16, the second adhesive layer 24b has a width equal to the widths W2 and W3 of the sidelong bars 16c and 16d. The external and internal surfaces of the frame 16 are flush with those of the second adhesive layers 24a, respectively. In other words, in terms of the distance between the sidelong bars 16c and 16d, the inside dimension between the sidelong bars 16c and 16d and that of the second adhesive layer 24b between on the sidelong bar 16c and on the sidelong bar 16d are equal to each other. Similarly, the outside dimension between the sidelong bars 16c and 16d and that of the second adhesive layer 24*b* between on the sidelong bar 16*c* and on the sidelong bar 16*d* are equal to each other.

The second adhesive layer 24*b* on the sidelong bar 16*c* and each of the longwise bars 16*a* and 16*b* of the frame 16 is formed thicker than that on the sidelong bar 16*d* on the light source side, and for example, is formed approximately twice thicker than that on the sidelong bar 16*d*. In this case, two stacked adhesive layers each having a thickness equal to that of the first adhesive layer 24*a* can be used as the second adhesive layer 24*b*. In addition, the second adhesive layer 24*b* on the sidelong bar 16*d* on the light source side is made thinner than that on the longwise bars 16*a* and 16*b*, whereby a gap for passing a printed circuit board 32 of the light source unit 30 is formed.

The reflective sheet RE is attached to the lower surface of the frame 16 with the first adhesive layer 24*a*, and covers the lower surface side of the frame 16. The reflective sheet RE is formed to have a film thickness of 200 µm or less, and further, the film thickness is preferably 50 to 90 µm. The reflective sheet RE has reflectivity of 90% or more, and further, the reflectivity is preferably 95% or more. In addition, the reflective sheet RE is formed into a rectangle having outside dimensions equal to those of the frame 16. The external surface of the reflective sheet RE is thereby flush with that of the frame 16. That is, each of the reflective sheet RE and the frame 16 does not project further than the other.

As shown in FIG. 3 to FIG. 5, the backlight unit 20 comprises optical members stored in the frame 16. The optical members include a lightguide plate LG in the shape of a rectangle in a planar view and optical sheets OS stacked on the lightguide plate LG. Moreover, the backlight unit 20 comprises the light source unit 30 which is provided along one side surface (incidence surface) of the lightguide plate LG and which makes light enter the lightguide plate LG.

The lightguide plate LG is formed by shaping transmissive resin into an extremely thin rectangle, and has the shape of like a rectangular parallelepiped. The lightguide plate LG comprises a first main surface S1 which is a light exit surface, a second main surface S2 on the opposite side to the first main surface S1, and an incidence surface EF connecting the first main surface S1 and the second main surface S2. In the present embodiment, the incidence surface EF is one side surface on the short sides of the lightguide plate LG. The lightguide plate LG has dimensions (length and width) slightly less than the inside dimensions of the frame 16 but slightly greater than the display area DA of the liquid crystal display panel 12. The thickness of the lightguide plate LG is the greatest on one side surface (incidence surface EF) side facing the light source unit 30, and is the smallest on the other side surface side on the opposite side to the one side surface. In the present embodiment, as the thickness of the lightguide plate LG, the thickness of the other side surface is, for example, approximately 0.2 to 0.5 mm (200 to 500 µm).

The thickness T1 of the frame 16 is less than that of the thinnest portion of the lightguide plate LG. In addition, the sum of the plate thickness of the lightguide plate LG and the thicknesses of the optical sheets OS is substantially equal to that of the thickness T1 of the frame 16 and the thicknesses T2 and T3 of the first adhesive layer 24*a* and the second adhesive layer 24*b*. That is, the sum of the thicknesses of the lightguide plate LG and the optical sheets OS is, for example, 0.36 to 0.52 mm (360 to 520 µm). Moreover, the extremely thin lightguide plate LG having a plate thickness of 0.02 mm (20 µm) or less also can be used. The lightguide plate LG is overlaid on the reflective sheet RE in a state in which the second main surface S2 is opposed to the reflective sheet RE. The incidence surface EF is opposed to the sidelong bar 16*d*. The other side surfaces of the lightguide plate LG are opposed to the sidelong bar 16*c* and the longwise bars 16*a* and 16*b* with a small gap of approximately 0.05 to 0.2 mm (50 to 200 µm) therebetween, respectively.

The optical sheets OS have light transmitting properties, and are disposed to be stacked on the first main surface S1 of the lightguide plate LG. In the present embodiment, a diffusion sheet OS1 and a prism sheet OS2 formed of synthetic resin, for example, polyethylene terephthalate, are used as the optical sheets OS. The optical sheets OS are disposed to be stacked in order on the first main surface S1 of the lightguide plate LG. Each of the optical sheets OS is formed to have a width equal to that of the lightguide plate LG and a length slightly less than that of the lightguide plate LG, and formed to have dimensions slightly greater than those of the display area DA. The side edges except a side edge on the light source side, that is, three side edges of each of the optical sheets OS are directly opposed to the frame 16 with a predetermined gap (0.1 to 0.5 mm) therebetween. In addition, the optical sheets OS are opposed to the rear surface of the liquid crystal display panel 12 with a small gap therebetween. The optical sheets OS are thereby opposed to the whole display area DA.

As shown in FIG. 3 and FIG. 5, the light source unit 30 comprises the printed circuit board (FPC) 32 in the shape of a narrow long strip, and light sources mounted on the printed circuit board 32. As the light sources, in the present embodiment, light-emitting diodes (LEDs) 34, which are point light sources, arranged at predetermined intervals are used. Each of the LEDs 34 comprises a light-emitting surface 34*a* and a mounting surface 34*b* perpendicular to the light-emitting surface 34*a*. The LEDs 34 are arranged at predetermined intervals in the longitudinal direction of the printed circuit board 32 (direction parallel to the sidelong bars of the frame 16). Each of the LEDs 34 is mounted in a state in which the mounting surface 34*b* is opposed to the printed circuit board 32. In addition, the printed circuit board 32 comprises a connection end portion 32*a* extending from one side edge.

One longwise bar of the printed circuit board 32 is overlaid on the sidelong bar 16*d* by the second adhesive layer 24*b*, and the other longwise bar thereof is located on an end portion on the incidence surface EF side of the lightguide plate LG. The LEDs 34 are thereby disposed between the sidelong bar 16*d* and the incidence surface EF, and the light-emitting surfaces 34*a* are each opposed to the incidence surface EF. In the present embodiment, the LEDs 34 are disposed in the depressions 17 of the sidelong bar 16*d*. For example, each of the LEDs 34 preferably has a height (thickness) Lh of 0.4 mm (400 µm) or less, and more preferably has a height (thickness) Lh of 0.3 mm (300 µm) or less.

As the light sources, fluorescent tubes or cathode-ray tubes as line light sources also can be adopted. Alternatively, as the light sources, line light sources or surface light sources obtained by disposing organic electroluminescent light sources extremely closely can be adopted.

As shown in FIG. 5, a fourth adhesive layer, for example, double-sided tape 37, is attached to an end portion on the light source side of the optical sheet OS2 and to an end portion on the optical sheets side of the printed circuit board 32. In addition, one end portion on the light source side of the lowest optical sheet (diffusion sheet) OS1 extends further to the light source side than that of the upper optical sheet (prism sheet) OS2, and is attached to the double-sided tape 37. The optical sheets OS1 and OS2 are thereby joined to the printed circuit board 32 with the double-sided tape 37. In addition, since the printed circuit board 32 is fixed to the frame 16, end portions on the mounting side of the optical sheets OS1 and OS2 are fixed to the frame 16 via the printed circuit board 32.

Moreover, as shown in FIG. 3 and FIG. 5, a third adhesive layer in the shape of a narrow long strip, for example, double-sided tape 36, is overlaid on and attached to the printed circuit board 32 and end portions of the optical sheets OS.

The backlight unit 20 having the above-described structure is disposed to be opposed to the rear surface of the liquid crystal display panel 12, and attached to the polarizer PL2 with the second adhesive layer 24b and the double-sided tape 36.

That is, the pair of longwise bars 16a and 16b is attached to end portions on the long sides of the rear surface of the polarizer PL2 with the second adhesive layer 24b, respectively, and thereby locating along the long sides of the polarizer PL2. The sidelong bar 16c is attached to an end portion on a short side of the rear surface of the polarizer PL2 with the second adhesive layer 24b, and located along the short side of the polarizer PL2. The longwise bars 16a and 16b and the sidelong bar 16c are thereby located to be overlaid on the frame area ED in a planar view, and are flush with a pair of long side surfaces and a short side surface of the polarizer PL2.

In the present embodiment, at the sides except the side on the light-source mounting side, that is, at least three sides, the structure in which the end portion of the polarizer PL2 is flush with that of the liquid crystal display panel 12 or the structure in which the end portion of the polarizer PL2 is located further inward than that of the liquid crystal display panel 12 can be adopted.

The printed circuit board 32 attached to the other sidelong bar 16d of the frame 16 is attached to, not the polarizer PL2, but the rear surface side of the first insulating substrate SUB1 of the liquid crystal display panel 12 with the double-sided tape 36. The sidelong bar 16d of the frame 16 and the light source unit 30 are thereby located to be overlaid on the frame area ED of the liquid crystal display panel 12.

The optical sheets OS1 and OS2 and the lightguide plate LG are opposed to the display area DA of the liquid crystal display panel 12. In addition, the printed circuit board 32 of the light source unit 30 is connected to the FPC 22 via the connection end portion 32a (see FIG. 2). A drive current is thereby supplied to the LEDs 34 via the FPC 22 and the printed circuit board 32. Light emitted from the LEDs 34 enters the lightguide plate LG from the incidence surface EF of the lightguide plate LG, and travels in the lightguide plate LG. The light exits from the second main surface S2 of the lightguide plate LG once, then is reflected by the reflective sheet RE, and enters the lightguide plate LG again. After passing through such a light path, the light from the LEDs 34 exits from the first main surface (light exit surface) S1 of the lightguide plate LG to the liquid crystal display panel 12 side. The exiting light is diffused by the optical sheets OS, and then radiates to the display area DA of the liquid crystal display panel 12.

Figure 6:
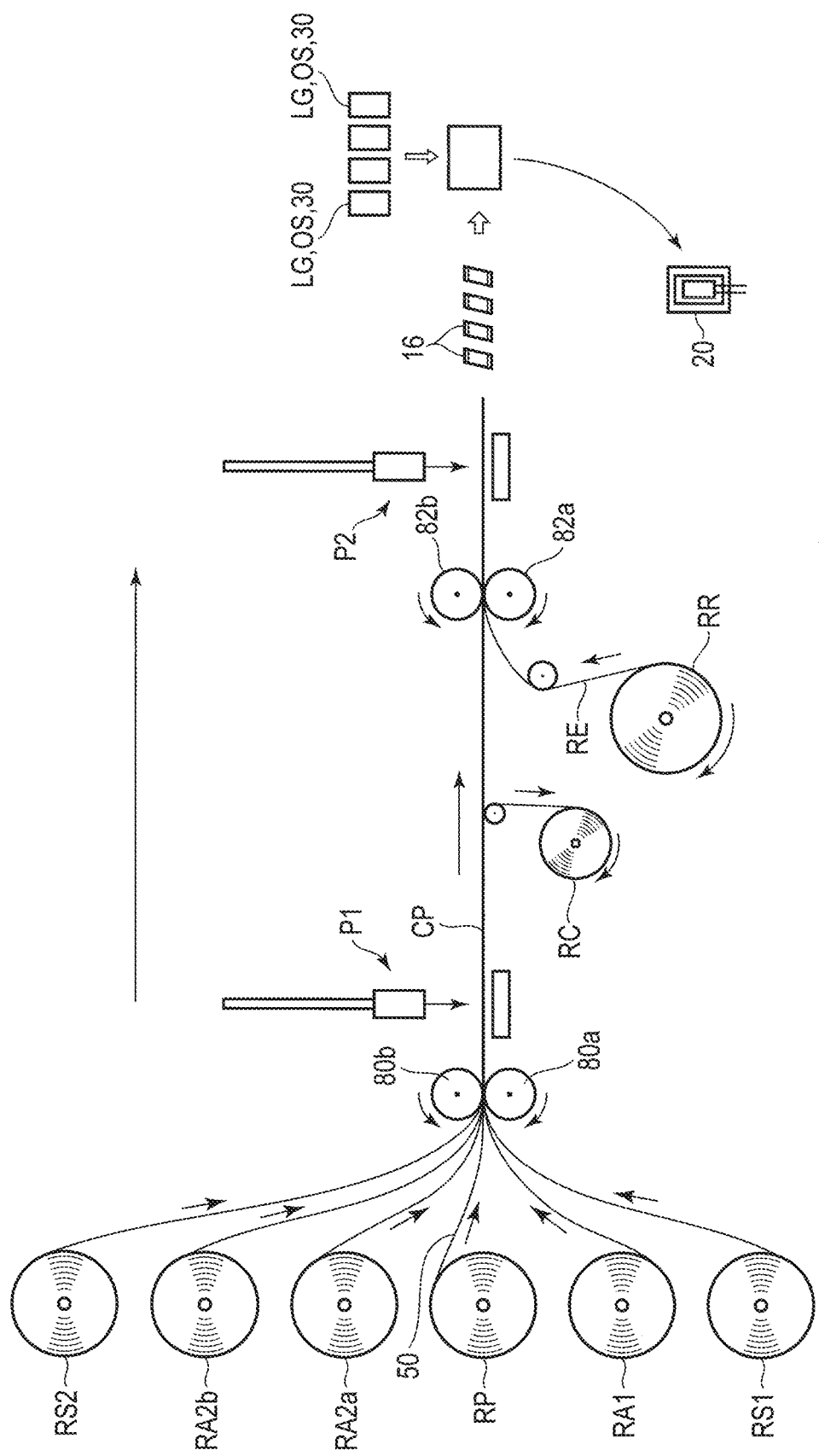
FIG. 6 is a diagram schematically showing an example of a manufacturing apparatus of backlight devices.

Next, an example of a method of manufacturing the backlight unit (backlight device) 20 having the above-described structure will be described. FIG. 6 is a diagram schematically showing an example of a manufacturing apparatus and all manufacturing processes. FIG. 7 to FIG. 11 are perspective views schematically showing the state of a sheet in the respective manufacturing processes.

As shown in FIG. 6, the manufacturing apparatus comprises rolls RP, RA1, RA2a, RA2b, RS1, RS2, and RR, each of which is formed by rolling a long sheet like material, a pair of first conveyance rollers 80a and 80b which conveys sheet materials drawn from the rolls along a conveyance path CP, a pair of second conveyance rollers 82a and 82b, a collection roll RC into which a separator is rolled and collected, a first punch P1 and a second punch P2 which punch sheet materials moving along the conveyance path CP, etc.

The rolls include the roll RP, into which a sheet material for forming a frame, for example, a PET sheet 50, is rolled; the roll RA1, into which a first adhesive layer is rolled; the rolls RA2a and RA2b, into which second adhesive layers are rolled respectively; and the rolls RS1 and RS2, into which separators are rolled respectively. In the present embodiment, only adhesive layers, or combinations of a base material and pressure-sensitive adhesive, are used as the first and second adhesive layers. Double-sided tape may be used as the adhesive layers.

In addition, the width of each of the rolls is equal to the outside dimension between the short sides of the backlight unit. Only the roll RA2b has a width slightly less than those of the other rolls.

Figure 7:
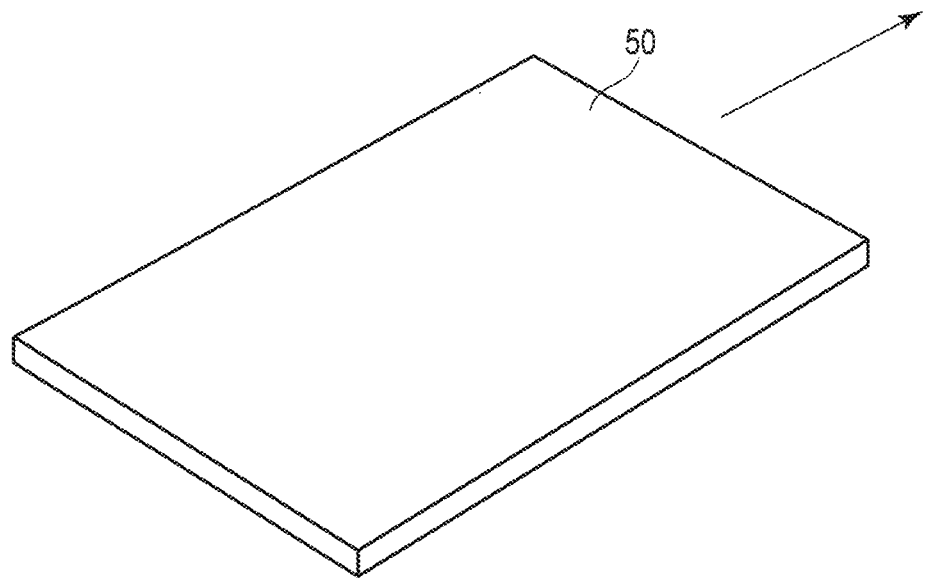
FIG. 7 is a perspective view showing a sheet material in manufacturing processes of the backlight devices.
Figure 8:
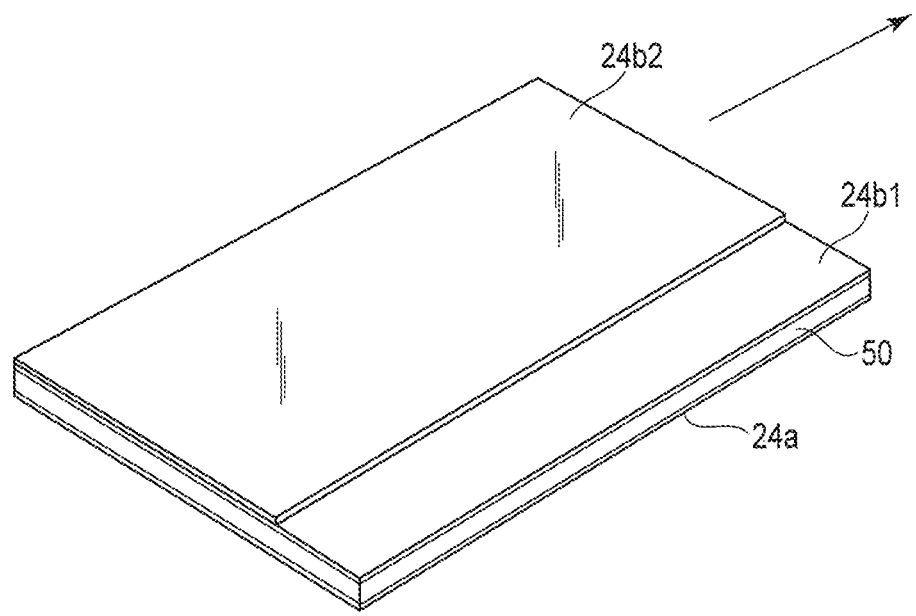
FIG. 8 is a perspective view showing a state in which adhesive layers are formed on a first surface and a second surface of the sheet material, respectively, in the manufacturing processes.

As shown in FIG. 6, first, sheet materials drawn from the rolls RP, RA1, RA2a, RA2b, RS1, and RS2, for example, the PET sheet 50, the first adhesive layer 24a, a second adhesive layer 24b1, a second adhesive layer 24b2, and the separators, are conveyed through a space between the pair of conveyance rollers 80a and 80b, and thereby stacked on and attached to each other. That is, as shown in FIG. 7 and FIG. 8, the first adhesive layer 24a is attached to the whole lower surface (first surface) of the PET sheet 50. In addition, the second adhesive layer 24b1 is attached to the whole upper surface (second surface) of the PET sheet 50, and further, the second adhesive layer 24b2 is attached thereto in an area except a predetermined area along one side portion. Surfaces on the opposite side to those attached to the PET sheet 50 of the first adhesive layer 24a and the second adhesive layer 24b2 are covered by the separators.

Figure 9:
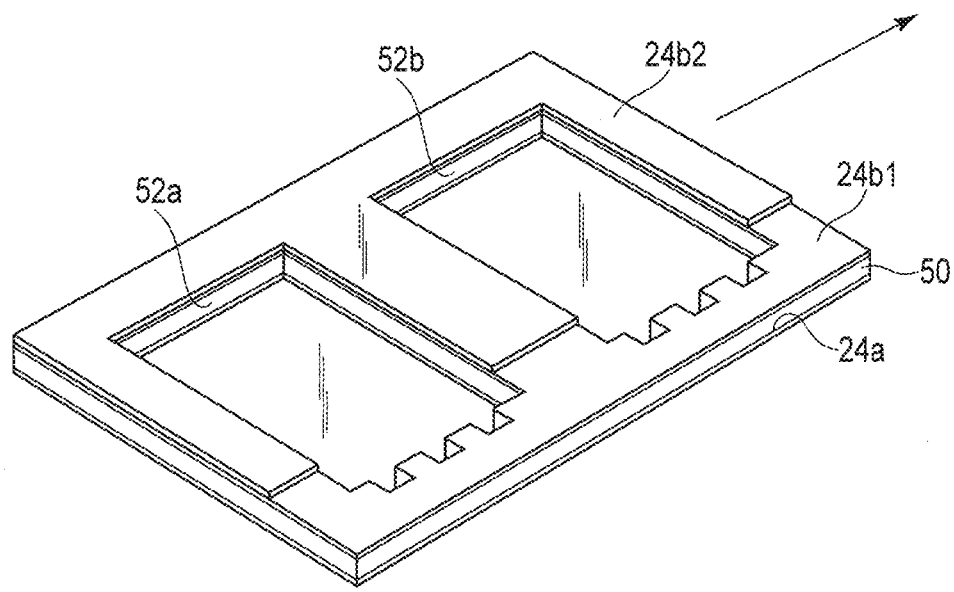
FIG. 9 is a perspective view showing a state in which inner windows (inner holes) of frames are punched in the manufacturing processes.
Figure 10:
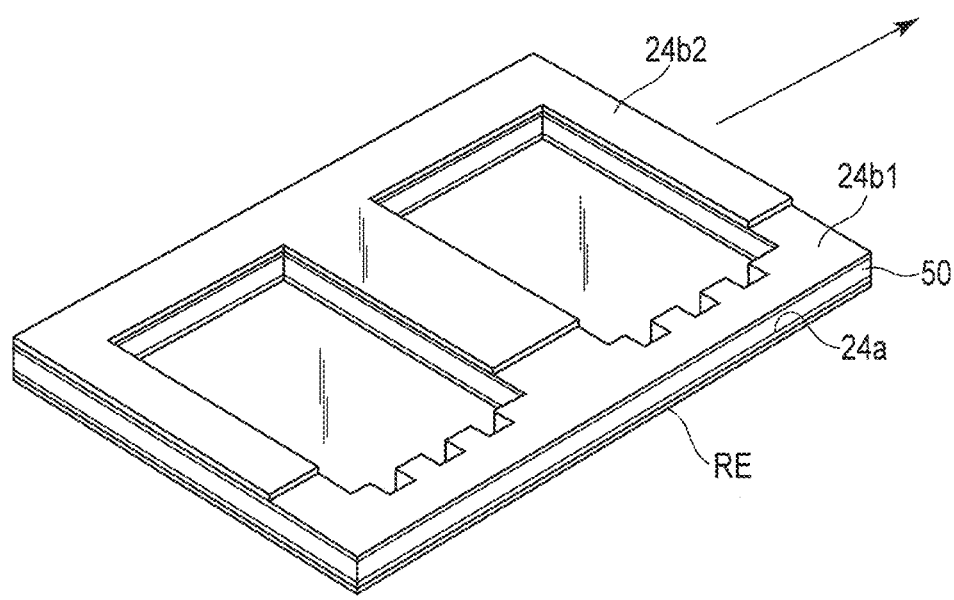
FIG. 10 is a perspective view showing a state in which a reflective sheet is attached to one of the adhesive layers in the manufacturing processes.

Next, as shown in FIG. 6 and FIG. 9, the first adhesive layer 24a, the sheet material 50, the second adhesive layers 24b1 and 24b2, and the separators are punched together by the first punch (a metal mold, etc) P1, and rectangular inner holes 52a and 52b corresponding to the inner shapes (inner holes) of frames are sequentially formed. Then, the separator on the first adhesive layer 24a is peeled off, and rolled and collected into the collection roll RC. In this state, as shown in FIG. 6 and FIG. 10, the reflective sheet RE drawn from the roll RR is attached to the whole surface of the first adhesive layer 24a. The sheet material 50, the adhesive layers, and the reflective sheet RE pass through a space between the pair of conveyance rollers 82a and 82b, and are conveyed along the conveyance path CP.

Figure 11:
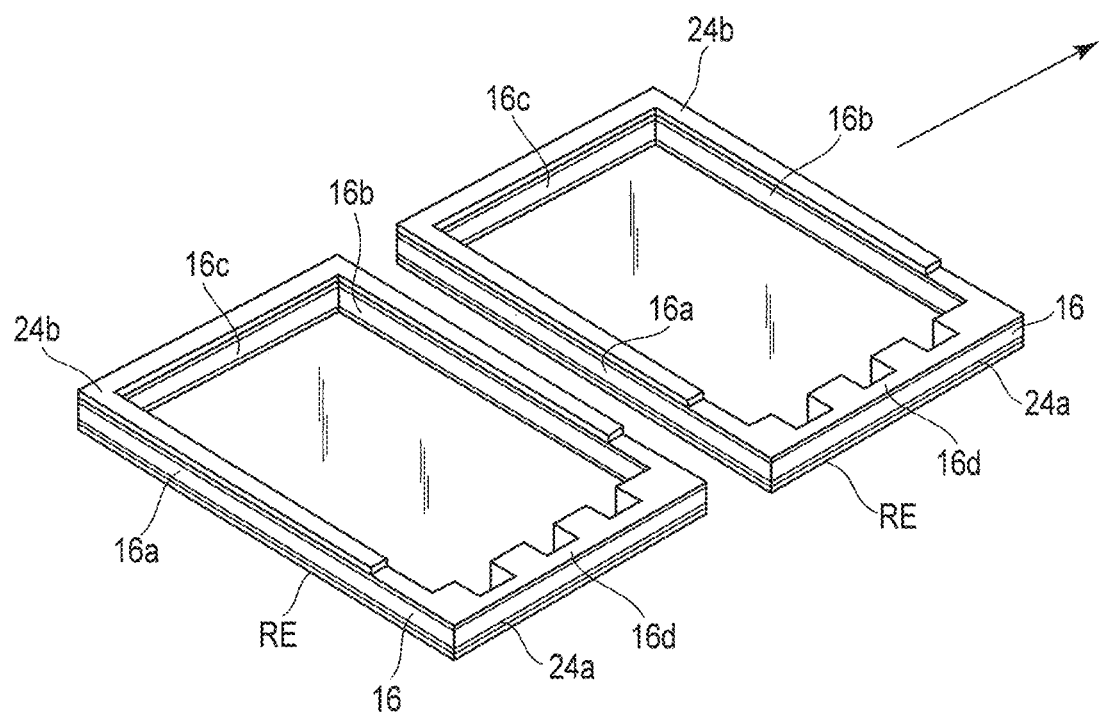
FIG. 11 is a perspective view showing the backlight devices, the outer shapes of which are formed by punching, in the manufacturing processes.

Then, as shown in FIG. 6 and FIG. 11, the first adhesive layer 24a, the sheet material 50, the second adhesive layers 24b1 and 24b2, the separator on the second adhesive layer 24b2, and the reflective sheet RE are punched together by the second punch (a metal mold, etc.) P2, and the outer shapes of frames 16, reflective sheets RE, and first and second adhesive layers are formed at once. The frames 16 provided with the reflective sheets RE and the adhesive layers are thereby sequentially formed. Then, as shown in FIG. 6, backlight units 20 are obtained by mounting and fixing lightguide plates LG, optical sheets OS, and light source units 30 on the formed frames 16. The lightguide plates LG, the optical sheets OS, and the light source units 30 may be unitized in advance by joining them to each other with adhesive layers, for example, double-sided tape.

Figure 12:
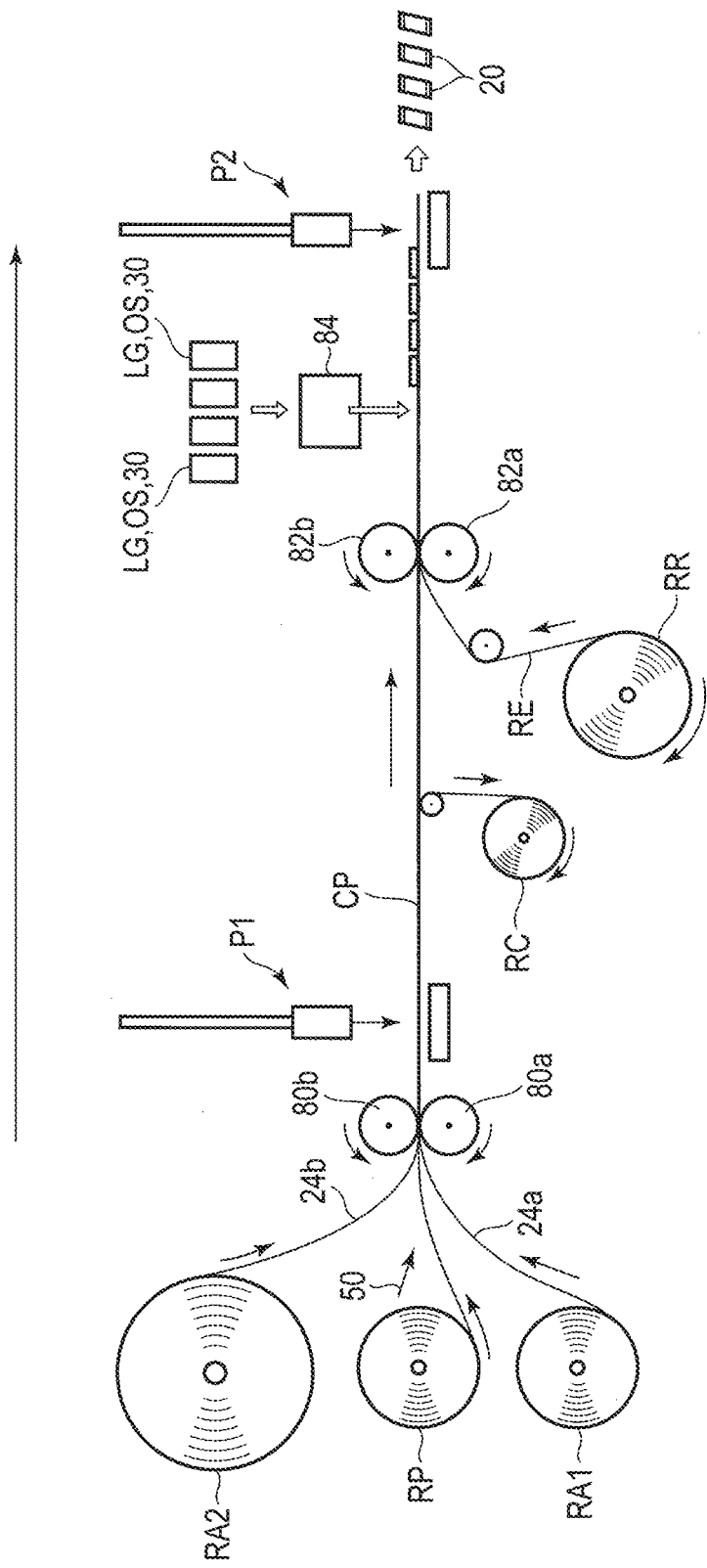
FIG. 12 is a diagram schematically showing another example of the manufacturing apparatus of the backlight devices.

FIG. 12 schematically shows another example of the manufacturing apparatus and the manufacturing processes. In the present embodiment, double-sided tape is used as each of the first adhesive layer 24a and the second adhesive layer 24b. The second adhesive layer 24b has a width slightly less than that of the first adhesive layer 24a, and is provided on the side portions except the sidelong bar 16d. Namely, the second adhesive layer 24b is provided on the pair of longwise bars 16a and 16b and the sidelong bar 16c not on the light-source mounting side. The second adhesive layer 24b is thicker than the first adhesive layer 24a, and for example, approximately twice thicker than the first adhesive layer 24a. The double-sided tape comprises a base material, adhesive layers formed on both surfaces of the base material, and a separator attached to one of the adhesive layers. The double-sided tape is rolled into the rolls RA1 and RA2. In addition, a loading device 84 is provided between the pair of conveyance rollers 82a and 82b and the second punch P2.

According to the manufacturing processes in which the above-described manufacturing apparatus is used, as shown in FIG. 12, first, the PET sheet 50, the first adhesive layer (double-sided tape) 24a, and the second adhesive layer (double-sided tape) 24b drawn from the rolls RP, RA1, and RA2 are conveyed through the space between the pair of conveyance rollers 80a and 80b, and thereby stacked on and attached to each other. That is, the first adhesive layer 24a is attached to the whole lower surface (first surface) of the PET sheet 50, and the second adhesive layer 24b is attached to an area except a predetermined area along one side portion on the upper surface (second surface) of the PET sheet 50. The second adhesive layer 24b is thereby formed on the frame.

Next, the first adhesive layer 24a, the sheet material 50, and the second adhesive layer 24b are punched together by the first punch (a metal mold, etc.) P1, and the rectangular inner holes 52a and 52b corresponding to the inner shapes (inner holes) of the frames are sequentially formed. Then, the separator on the first adhesive layer 24a is peeled off, and rolled and collected into the collection roll RC. In this state, the reflective sheet RE drawn from the roll RR is attached to the whole surface of the first adhesive layer 24a. The sheet material 50, the first and second adhesive layers, and the reflective sheet RE pass through the space between the pair of conveyance rollers 82a and 82b, and are conveyed along the conveyance path CP.

Then, the lightguide plate LG, the optical sheets OS, and the light source unit 30 are mounted by the loading device 84 on predetermined positions of the sheet material 50 conveyed along the conveyance path CP, which are herein the inner holes of the frames. After the mounting, the first adhesive layer 24a, the sheet material 50, the second adhesive layer 24b, and the reflective sheet RE are punched together by the second punch (a metal mold, etc.) P2, and the outer shapes of the frame 16, the reflective sheet RE, and the first and second adhesive layers are formed at once. Backlight units 20 having predetermined shapes are thereby sequentially produced.

Figure 13:
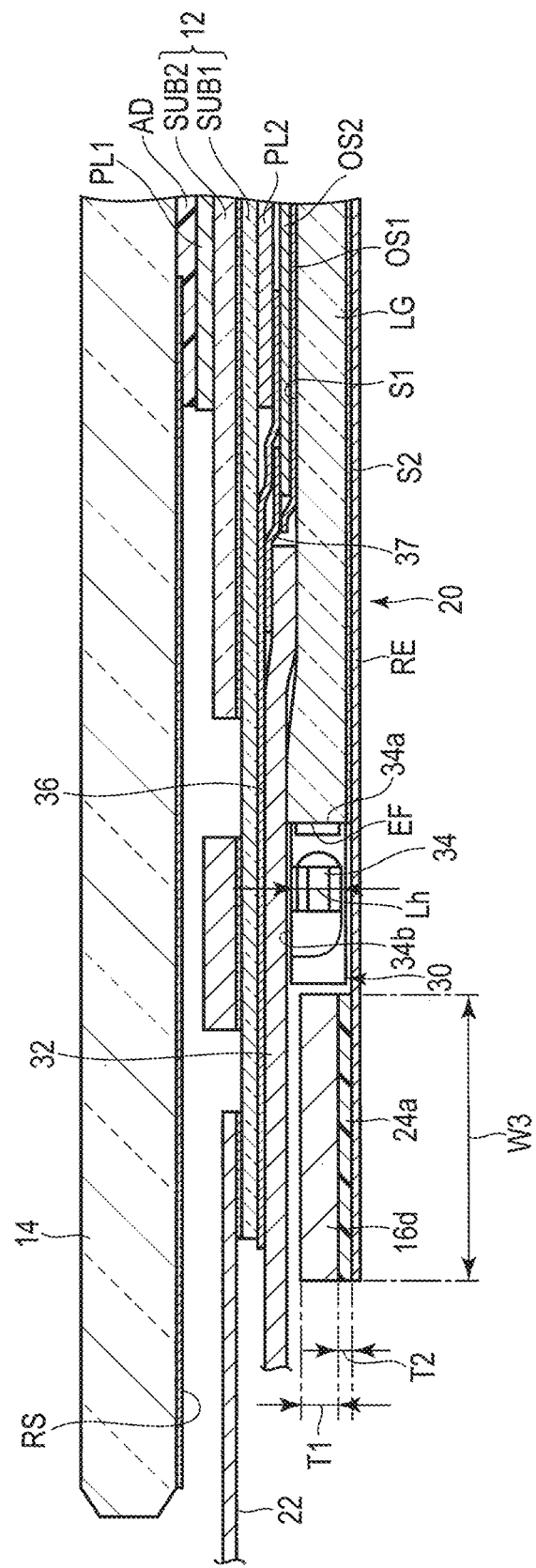
FIG. 13 is a sectional view showing a part of the liquid crystal display device comprising a backlight device manufactured by the manufacturing apparatus according to the above other example.

FIG. 13 is a sectional view showing a part of the liquid crystal display device comprising a backlight unit 20 manufactured by the above-described manufacturing apparatus. As shown in the figure, a second adhesive layer does not exist on the sidelong bar 16d on the light source side of the frame 16. A gap through which the printed circuit board 32 passes is thereby secured between the sidelong bar 16d and the first insulating substrate SUB1.

According to the liquid crystal display device 10, the backlight device, and the method of manufacturing the backlight device according to the present embodiment having the above-described structure, a frame of a backlight is formed by punching a thin sheet having a thickness of 0.4 mm (400 μm) or less, for example, a thickness of 0.15 to 0.25 mm (150 to 250 μm). A thin frame with narrow side portions, which is hard to produce by injection molding, can be thereby obtained. By using the frame, a backlight device and a liquid crystal display device which are ever thinner and have narrow frames can be achieved at low prices. For example, the thickness of a frame can be 0.2 mm or less, and the width of side portions can be 0.45 mm or less. A reduction in thickness and the narrowing of the frame can be easily achieved. Moreover, since the frame is made thinner, an extremely thin lightguide plate having a plate thickness of 0.2 mm or less can be used. Thus, an ever thinner backlight device can be obtained.

In addition, since a sheet, an adhesive layer formed on or attached to the sheet, and a reflective sheet are punched at once together with the frame, the width of the adhesive layer and the outside dimensions of the reflective sheet can be conformed to the frame at high precision.

In contrast to the present embodiment, in a comparative example in which adhesive layers are attached or applied to a frame afterward, it is hard to provide adhesive layers on the upper and lower surfaces of the frame in conformity to the width of the frame because the width of the frame is extremely small, and the adhesive layers will project. The projecting adhesive not only has a bad influence on subsequent processes, but also causes a decrease in the light-emitting performance of a backlight device if it adheres to the other structures of the backlight device. In contrast, in the backlight device of the present embodiment, the adhesive layers do not project. Thus, the width of the adhesive layers is conformed to that of the side portions of the frame, and the side surfaces (side edges) of the adhesive layers and those of the frame are flush with each other. Since an increase in the width of the frame due to the projection of the adhesive layers is suppressed, and a reduction in thickness and the narrowing of the frame are attempted. Moreover, since the sheet, the adhesive layers, and the reflective sheet are punched at once, the simplification of manufacturing processes and an improvement in the precision of each member are attempted. In addition, the tolerance between each member, which is required when the members are separately formed and stacked, can be reduced, and a further reduction in thickness and the further narrowing of the frame are attempted. Moreover, according to the present embodiment, it is unnecessary to attach or manage the adhesive layers in the manufacturing processes of the backlight device, and the simplification of the manufacturing processes and a reduction in the manufacturing cost can be attempted.

If a frame is formed of a resin sheet, colors other than white, for example, gray and black, can be adopted as the colors of the frame and adhesive layers. Thus, light reflected in the internal surface of the frame can be reduced, and the inside of the frame can be made ever closer to the display area of the display panel. Moreover, the homogeneity of light emitted to the whole display area including the periphery of the display area can be improved. In addition, if a frame is formed of a metal sheet of aluminum, etc., the heat radiation property of the frame is improved, and an increase in the temperature of a backlight device caused by the emission of light from a light source can be suppressed.

Next, a liquid crystal display device according to another embodiment will be described. In the other embodiment described hereinafter, the same portions as those of the above-described first embodiment will be given the same reference numbers and a detailed description thereof will be omitted or simplified. Portions differing from those of the first embodiment will mainly described in detail.

Second Embodiment

FIG. 14 is a sectional view showing a part of a liquid crystal display device according to a second embodiment.

As shown in FIG. 14, according to the liquid crystal display device of the present embodiment, for example, the highest optical sheet (prism sheet) OS2 stacked on a lightguide plate LG is formed to have dimensions greater than those of the lightguide plate LG and the other optical sheet OS1. At least three side portions of the optical sheet OS2, except for a side portion on the light source unit side, cover a gap between the lightguide plate LG and a frame 16. In the present embodiment, the three side portions of the optical sheet OS2 extend outward to positions corresponding to the external surface of the frame 16. The periphery of the optical sheet OS2 is attached to the upper surface of the frame 16 with a second adhesive layer 24*b*. Moreover, a fifth adhesive layer 24*c* in the shape of a strip is provided on the upper surface of the periphery of the optical sheet OS2. The fifth adhesive layer 24*c* constitutes an adhesive layer for attaching a backlight unit 20 to a display panel 12.

At at least three side portions of the frame 16, except for a side portion on the light source unit side, the external surface of the frame 16, the external surface of a first adhesive layer 24*a*, the external surface of the second adhesive layer 24*b*, the external surface of the second optical sheet OS2, and the external surface of the fifth adhesive layer 24*c* are flush with each other. In the present embodiment, the internal surface of the first adhesive layer 24*a*, the internal surface of the second adhesive layer 24*b*, and the internal surface of the fifth adhesive layer 24*c* are also flush with the internal surface of the frame 16. The structure in which the internal surface of the fifth adhesive layer 24*c* does not correspond to the internal surfaces of the other adhesive layers and the frame also can be adopted.

As the fifth adhesive layer 24*c*, double-sided tape with adhesive layers on both surfaces of a base material is used in the present embodiment. The thickness of each of the adhesive layers can be easily adjusted by changing the thickness of the base material. As the adhesive layers, for example, hotmelt adhesive, epoxy adhesive, and UV curing adhesive, can be used. The other structures of the backlight unit 20 are the same as those of the backlight unit in the above-described first embodiment.

The backlight unit 20 having the above-described structure is attached to a polarizer PL2 of the liquid crystal display panel 12 with the fifth adhesive layer 24*c* and double-sided tape not shown in the figure.

Next, an example of a method of manufacturing the backlight unit (backlight device) 20 having the above-described structure will be described. In the present embodiment, the backlight unit 20 is manufactured by using substantially the same manufacturing apparatus as the manufacturing apparatus shown in FIG. 12. Double-sided tape is used as each of the first adhesive layer and the second adhesive layer. The double-sided tape comprises a base material, adhesive layers formed on both surfaces of the base material, and a separator attached to one of the adhesive layers. The double-sided tape is rolled into rolls RA1 and RA2. In addition, a loading device 84 is provided between a pair of conveyance rollers 82*a* and 82*b* and a second punch P2.

Figure 15:
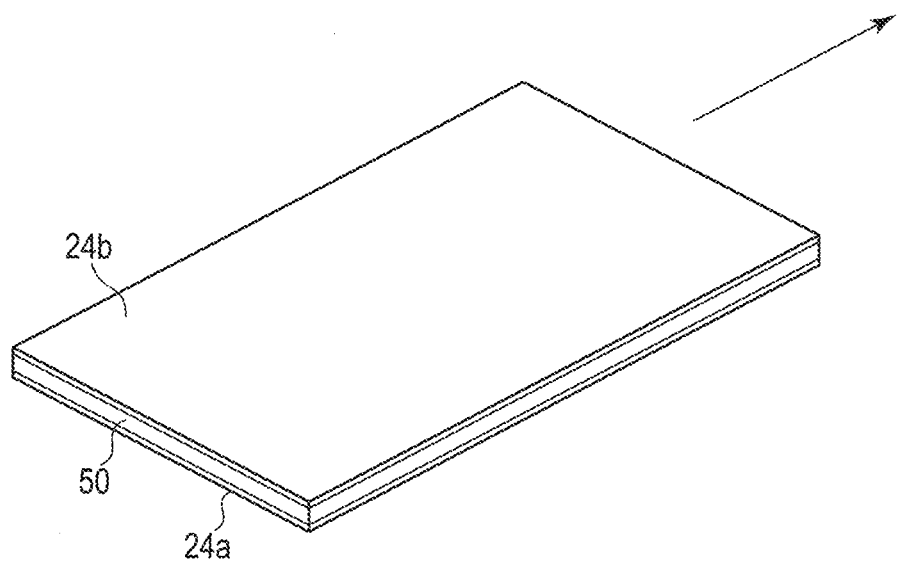
FIG. 15 is a perspective view showing a state in which adhesive layers are formed on a first surface and a second surface of a sheet material, respectively, in manufacturing processes of a backlight device according to the second embodiment.

First, a PET sheet 50, the first adhesive layer (double-sided tape) 24*a*, and the second adhesive layer (double-sided tape) 24*b* drawn from a roll RP, the roll RA1, and the roll RA2 are conveyed through a space between a pair of conveyance rollers 80*a* and 80*b*, and thereby stacked on and attached to each other. That is, as shown in FIG. 15, the first adhesive layer 24*a* is attached to the whole lower surface (first surface) of the PET sheet 50, and the second adhesive layer 24*b* is attached to the whole upper surface (second surface) of the PET sheet 50. In FIG. 15 and subsequent figures, arrows indicate the conveyance directions of a sheet, double-sided tape, etc., drawn from rolls.

Figure 16:
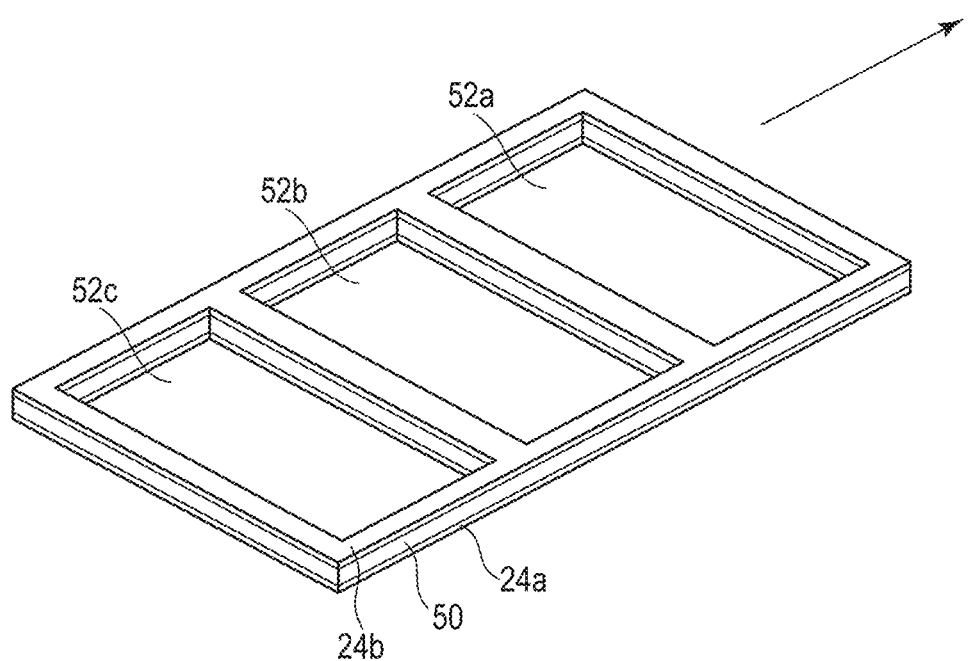
FIG. 16 is a perspective view showing a state in which inner windows (inner holes) of frames are punched in the manufacturing processes.
Figure 17:
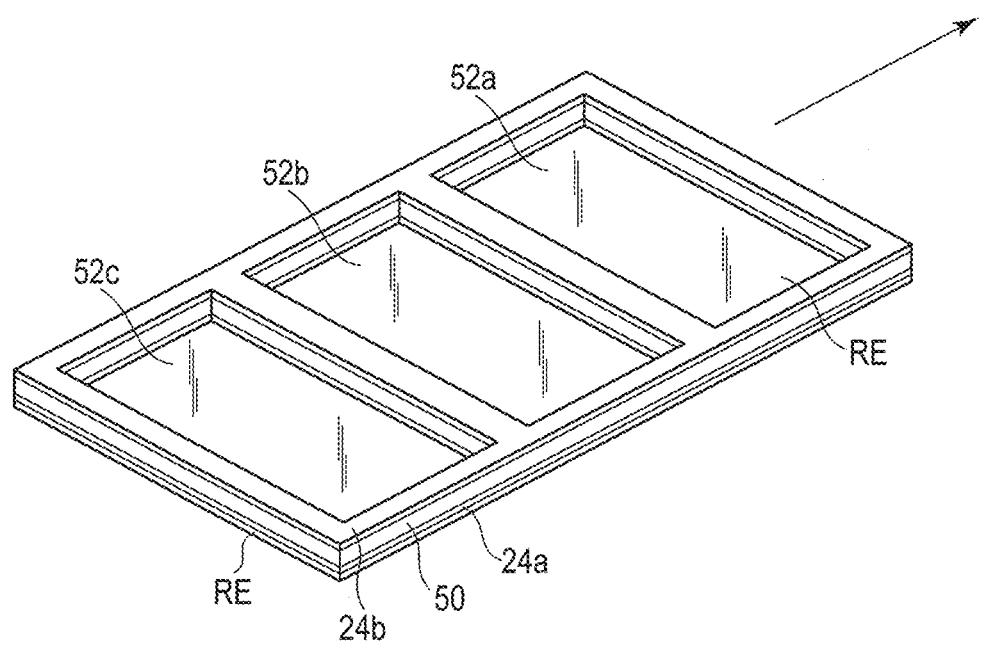
FIG. 17 is a perspective view showing a state in which a reflective sheet is attached to one of the adhesive layers in the manufacturing processes.

Next, as shown in FIG. 16, the first adhesive layer 24*a*, the sheet material 50, and the second adhesive layer 24*b* are punched together by a first punch (a metal mold, etc.) P1, and rectangular inner holes 52*a*, 52*b*, and 52*c* corresponding to the inner shapes (inner holes) of frames are sequentially formed. Then, a separator on the first adhesive layer 24*a* is peeled off, and rolled and collected into a collection roll RC. Moreover, a reflective sheet RE drawn from a roll RR, the sheet material 50, and the first and second adhesive layers pass through a space between the pair of conveyance rollers 82*a* and 82*b*, and are conveyed along a conveyance path CP. As shown in FIG. 17, a stacked body with the reflective sheet RE attached to the whole surface of the first adhesive layer 24*a* is thereby formed.

Figure 18:
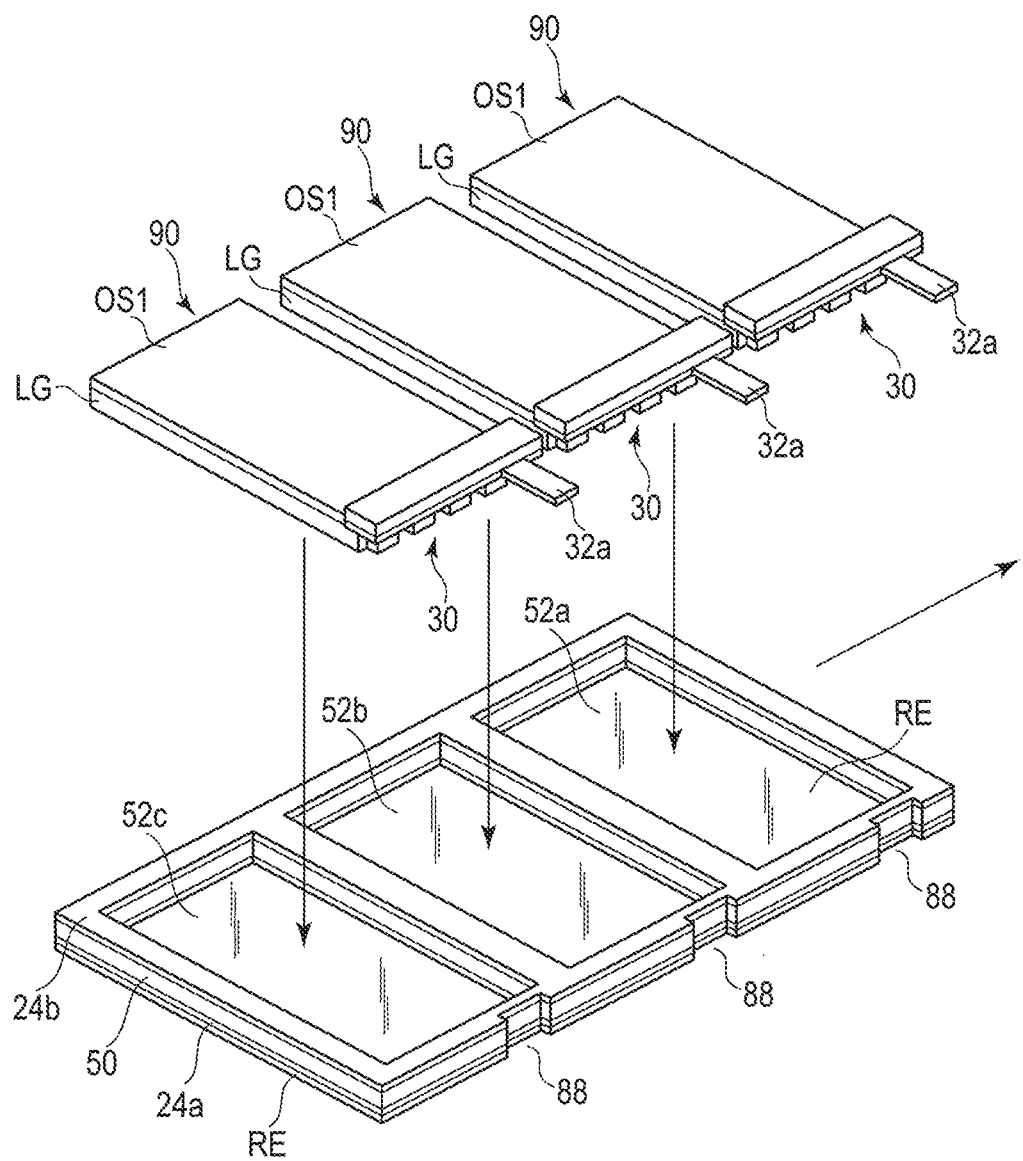
FIG. 18 is an exploded perspective view showing a stacked body in which depressions for accepting FPCs are formed and lightguide units in the manufacturing processes.
Figure 19:
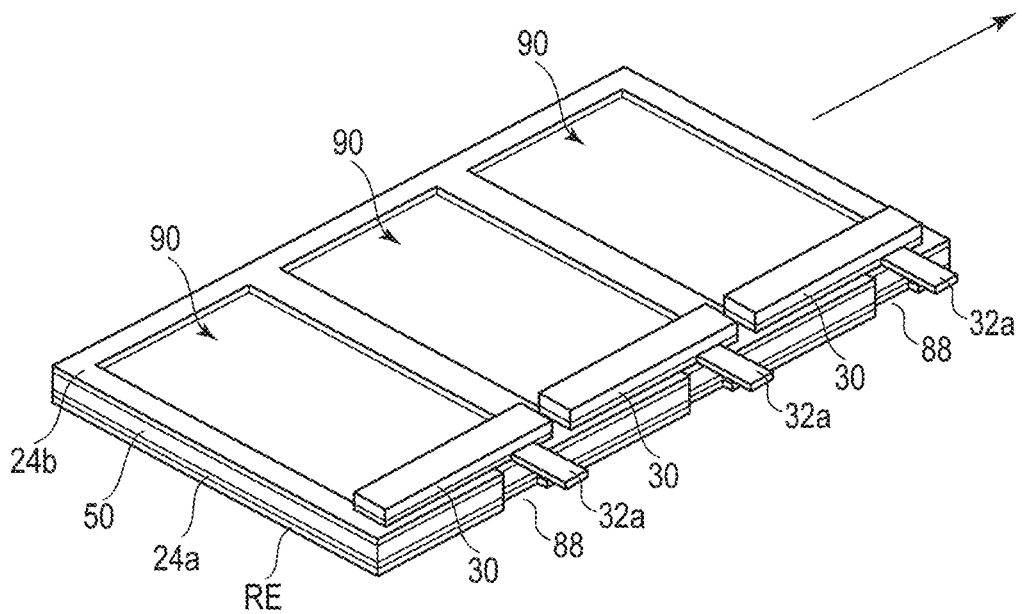
FIG. 19 is a perspective view showing a state in which the lightguide units are mounted in the inner holes of the frames in the manufacturing processes.

As shown in FIG. 18, depressions 88 for accepting FPCs of light source units 30 are formed at a side edge of the stacked body by a punch not shown in the figure. In addition, lightguide units 90, into which lightguide plates LG, optical sheets OS1, and the light source units 30 are assembled, are prepared. As shown in FIG. 19, the lightguide units 90 are sequentially mounted by the loading device 84 on predetermined positions of the sheet material 50 conveyed along the conveyance path CP, which are herein the inner holes 52*a*, 52*b*, and 52*c* of the frames. In a state in which the lightguides LG and the optical sheets OS1 are mounted in the inner holes 52*a*, 52*b*, and 52*c*, the upper surfaces of the optical sheets OS1 are flush with the second adhesive layer 24*b* of frames 16.

Figure 20:
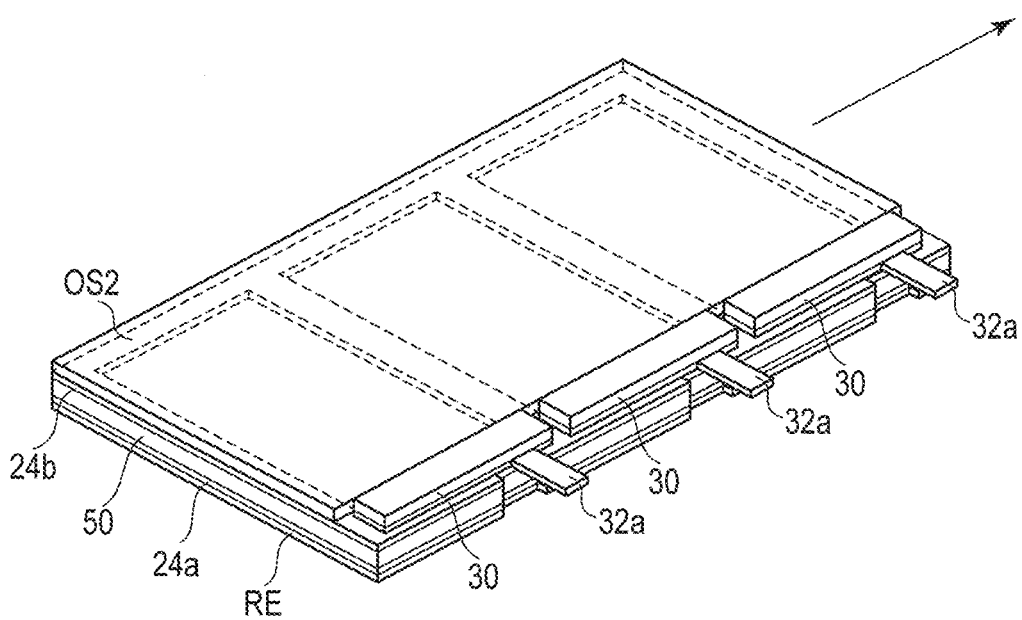
FIG. 20 is a perspective view showing a state in which an optical sheet is attached to and overlaid on the frames and the lightguide units in the manufacturing processes.

Next, as shown in FIG. 20, the optical sheet (prism sheet) OS2 is drawn from a roll not shown in the figure, and stacked on and attached to the second adhesive layer 24*b* of the stacked body. The optical sheet OS2 covers the frames 16 and the optical sheets OS1 except the light source units 30. Then, as shown in FIG. 21, the fifth adhesive layer (double-sided tape) 24*c* is drawn from a roll not shown in the figure, and stacked on and attached to the optical sheet OS2 and the light source units 30 of the stacked body. Inner holes 92*a*, 92*b*, and 92*c* are formed in advance in the fifth adhesive layer 24*c*. Then, the fifth adhesive layer 24*c* is attached to the optical sheet OS2 in a state in which the inner holes 92*a*, 92*b*, and 92*c* are aligned with the inner holes 52*a*, 52*b*, and 52*c* of the sheet material 50, respectively.

After the fifth adhesive layer 24*c* is attached, the fifth adhesive layer 24*c*, the optical sheet OS2, the first adhesive layer 24*a*, the sheet material 50, the second adhesive layer 24*b*, and the reflective sheet RE are punched together by the second punch (a metal mold, etc.) P2. As shown in FIG. 22, the outer shapes of the frames 16, reflective sheets RE, optical sheets OS2, and first, second, and fifth adhesive layers 24*a*, 24*b*, and 24*c* are thereby formed at once. At this time, punching can be performed without damaging the FPCs by punching the end portion on the light source side of the stacked body in a state in which FPCs (connection end portions) 32a of the light source units 30 are retracted into the depressions 88 of the stacked body. Backlight units 20 having predetermined shapes are thereby sequentially produced.

According to the above-described second embodiment, a backlight device and a liquid crystal display device which are thin and have narrow frames can be achieved at low cost as in the case of the first embodiment. In addition, a gap between the lightguide plate LG and the frame 16 is covered by the optical sheets OS. Thus, light in the vicinity of the frame 16 of light emitted from the lightguide plate LG also passes through the optical sheets OS. As a result, even if the display surface of the liquid crystal display panel 12 is visually perceived, non-uniformity in brightness at the periphery of the lightguide plate LG is sufficiently suppressed, and an improvement in display quality is attempted. Moreover, if the frame 16 and adhesive layers 24a, 24b are colored not white (for example, black), unnecessary light due to the reflection in the internal surface of the frame 16 can be reduced, and the brightness state of the inner surface side of the frame 16 can be made closer to that of the central portion of the display area DA. As a result, a backlight device wherein the further narrowing of the frame can be attempted can be achieved.

First Modification

Figure 23:
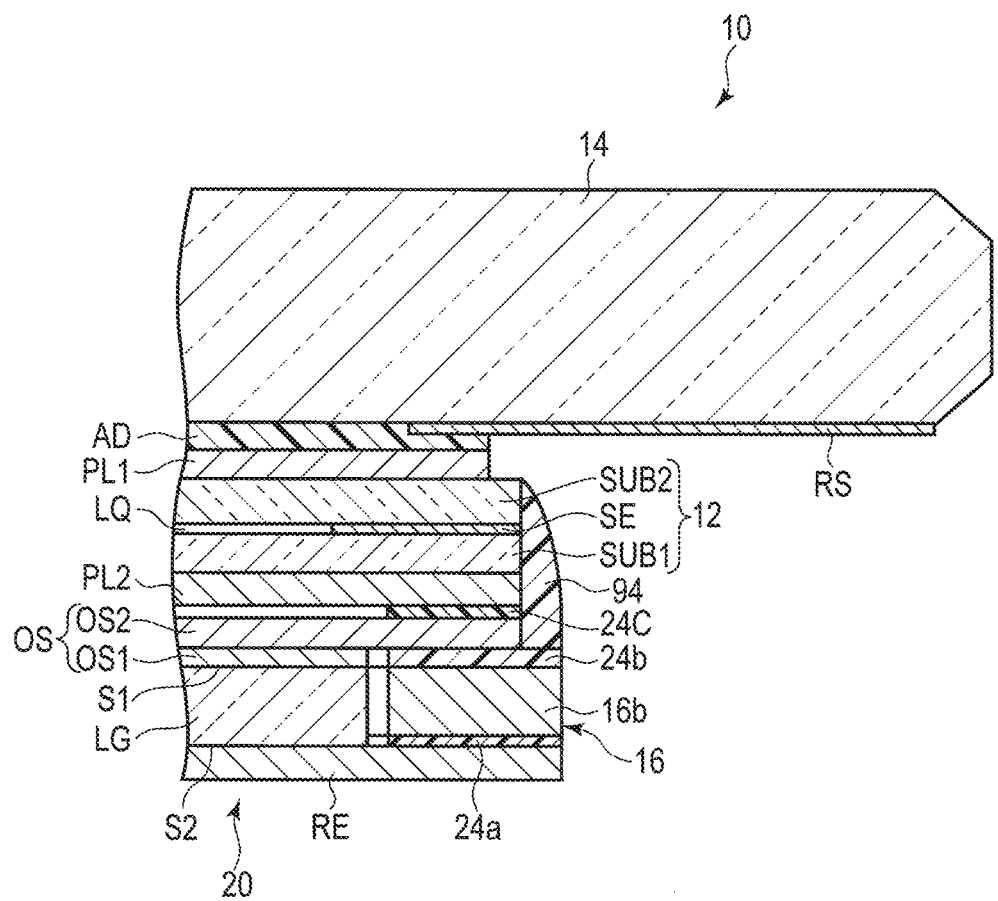
FIG. 23 is a sectional view showing a part of the liquid crystal display device according to a first modification.

FIG. 23 is a sectional view showing a part of the liquid crystal display device according to a first modification of the liquid crystal display device of the second embodiment.

As shown in the figure, for example, the highest optical sheet (prism sheet) OS2 stacked on the lightguide plate LG is formed to have dimensions greater than those of the lightguide plate LG and the other optical sheet OS1. At least the pair of longwise bars and the sidelong bar on the opposite side to the light source unit of the optical sheet OS2 cover a gap between the lightguide plate LG and the frame 16. According to the liquid crystal display device according to the present modification, the pair of longwise bars and the sidelong bar on the opposite side to the light source unit of the optical sheet OS2 are located further inward than the external surface of the frame 16. The periphery of the optical sheet OS2 is attached to the upper surface of the frame 16 with the second adhesive layer 24b. Moreover, the fifth adhesive layer 24c in the shape of a strip is provided on the upper surface of the periphery of the optical sheet OS2.

At at least the longwise bars 16a and 16b and the sidelong bar 16c, the external surface of the second optical sheet OS2, and that of the fifth adhesive layer 24c are flush with each other. In the present modification, the internal surface of the fifth adhesive layer 24c is also flush with that of the frame 16. Moreover, a resin adhesive layer 94 having a light-shielding property covers the external surface of the second optical sheet OS2 and the external surface of the liquid crystal display panel 12. Light leakage from the external surfaces of the second optical sheet OS2 and the liquid crystal display panel 12 can be thereby suppressed.

The other structures of the backlight unit 20 are the same as those of the backlight unit in the above-described second embodiment.

In the first modification having the above-described structure, in addition to the advantages of the second embodiment, light leakage from the external surfaces of the second optical sheet OS2 and the liquid crystal display panel 12 can be further prevented. As a result, a light-shielding function on the apparatus side of a display device, which is incorporated into the apparatus, can be simplified.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

All of the structures and manufacturing processes that can be implemented by a person with ordinary skill in the art through arbitrary design changes based on the structures and manufacturing processes described above as the embodiments of the present invention are included in the scope of the present invention as long as they encompass the spirit of the present invention.

Furthermore, other advantages that can be obtained by the above-described embodiments and are obvious from the description of this specification or can be conceived by a person with ordinary skill in the art as appropriate are naturally acknowledged as advantages of the present invention.

The number of optical sheets of the backlight unit is not limited to two, and may be increased or reduced as necessary. The outer and inner shapes of the liquid crystal display panel, the components of the backlight unit, and the frame are not limited to rectangles. Either or both of them may be other shapes such as circles, ellipses, and track shapes. Alternatively, they may be shapes with one or more curved sides. Materials used for the components are not limited to the above-described examples and may be selected from various options.

Figure 24:
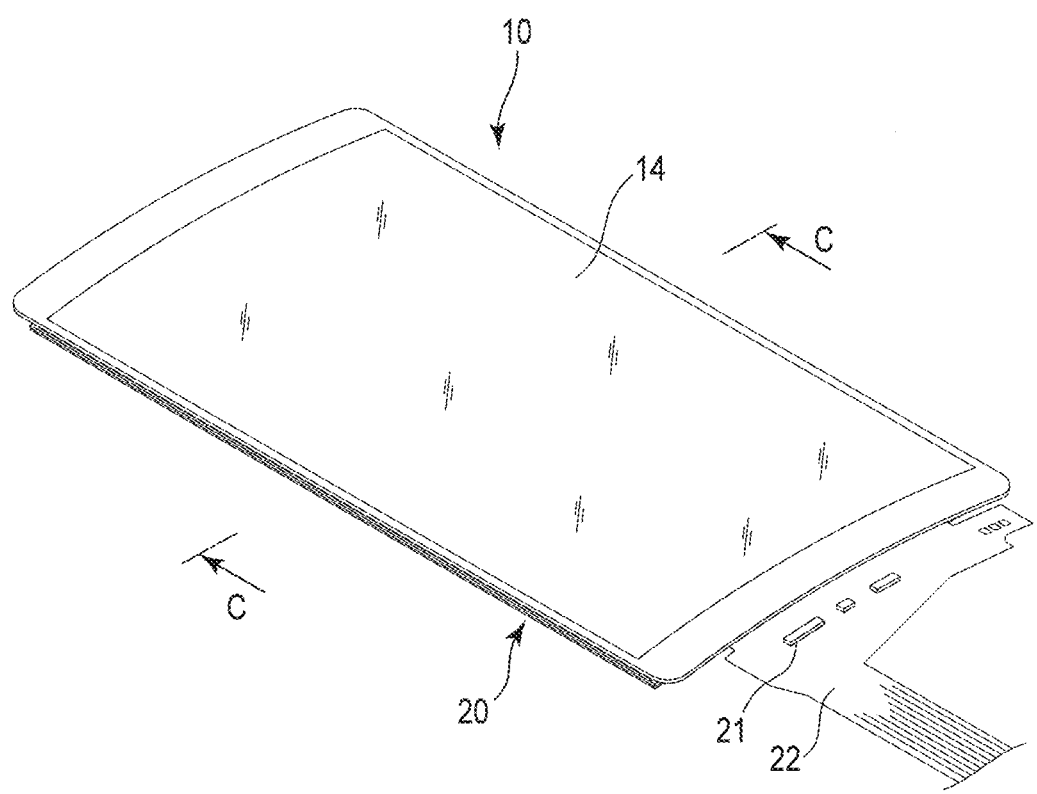
FIG. 24 is a perspective view showing an outside of the liquid crystal display device according to a second modification.

Moreover, each of the backlight devices of the present embodiments is extremely thin, and thus can easily curved as a whole in an out-of-plane direction. For example, as in the case of a second modification shown in FIG. 24 and FIG. 25, the structure of the liquid crystal display device in which the backlight unit 20 is attached to the liquid crystal display panel 12 and they are curved together in this state also can be adopted.

What is claimed is:
1. A display device comprising:
a liquid crystal display panel; and
a backlight device opposed to the liquid crystal display panel;
the backlight device comprising:
a frame-shaped structure with a first surface and a second surface, the second surface facing the liquid crystal display panel and being located between the liquid crystal display panel and the first surface;
a reflective sheet adhering to the first surface with a first adhesive layer; and
a light-shielding member covering a side surface of the liquid crystal display panel,
wherein the liquid crystal display panel adheres to the second surface with a second adhesive layer,
the second surface has a first region that is not in contact with the second adhesive layer,
the frame-shaped structure includes a portion that protrudes outward from the liquid crystal display panel in a plan view, and the light-shielding member overlaps the portion in the plan view.

2. The display device of claim 1, wherein the light-shielding member is a third adhesive layer made of resin.

3. The display device of claim 1, wherein a part of the second adhesive layer is located between the third adhesive layer and the second surface.

4. The display device of claim 1, wherein the liquid crystal display panel comprises a first substrate and a second substrate, and
the light-shielding member is in contact with a first side surface of the first substrate and a second side surface of the second substrate.

5. The display device of claim 4, wherein the second substrate is located between the first substrate and the frame-shaped structure,
the liquid crystal display panel includes a first polarizing plate located between the frame-shaped structure and the second substrate, and
the light-shielding member is in contact with the first polarizing plate.

6. The display device of claim 4, wherein the second substrate is located between the first substrate and the frame-shaped structure,
the liquid crystal display panel includes a second polarizing plate, the first substrate being located between the second polarizing plate and the second substrate, and
the light-shielding member is not in contact with the second polarizing plate.

7. The display device of claim 1, further comprising a first optical sheet between the liquid crystal display panel and the frame-shaped structure,
wherein the light-shielding member is in contact with the first optical sheet.

8. The display device of claim 7, further comprising a second optical sheet between the liquid crystal display panel and the reflective sheet,
wherein the light-shielding member is not in contact with the second optical sheet.

9. The display device of claim 8, further comprising a lightguide located on the reflective sheet,
wherein the frame-shaped structure surrounds the lightguide, and
the second optical sheet is located on the lightguide.

10. The display device of claim 9, wherein the second optical sheet is not located on the second surface.

11. The display device of claim 1, wherein the first adhesive layer is a frame-like shape on the first surface.

12. The display device of claim 1, wherein the frame-shaped structure is a rectangular shape with four sides, and
the first adhesive layer is located on the four sides successionally.

13. The display device of claim 1, wherein the frame-shaped structure is a rectangular shape with a first side, a second side, a third side, and a fourth side, and
the second adhesive layer is located on the first to third sides successionally, and is not located on the fourth side.

14. The display device of claim 13, wherein a printed circuit board is located on the fourth side, and
the frame-shaped structure is located between the printed circuit board and the reflective sheet.

15. The display device of claim 14, wherein the backlight device includes light sources, and
the printed circuit board is electrically connected to the light sources.

16. The display device of claim 1, wherein a printed circuit board is located on the first region, and
the frame-shaped structure is located between the printed circuit board and the reflective sheet.

17. The display device of claim 1, wherein a thickness of the second adhesive layer is greater than a thickness of the first adhesive layer.

18. The display device of claim 1, wherein the liquid crystal display panel has a first polarizing plate facing the frame-shaped structure, and
the first polarizing plate covers at least two of internal surfaces of the first adhesive layer, the two internal surfaces facing each other.

19. The display device of claim 18, wherein the first polarizing plate does not cover the first region.

20. The display device of claim 1, wherein the second surface has a second region that is in contact with the second adhesive layer and does not overlap the light-shielding member in the plan view, and
a prism sheet overlaps the second region in the plan view.

* * * * *